(12) United States Patent
Klasen-Memmer et al.

(10) Patent No.: US 9,550,942 B2
(45) Date of Patent: Jan. 24, 2017

(54) LIQUID CRYSTAL MEDIUM AND ELECTROOPTICAL DISPLAY CONTAINING SAME

(75) Inventors: Melanie Klasen-Memmer, Heuchelheim (DE); Izumi Saito, Darmstadt (DE); Herbert Plach, Darmstadt (DE); Kazuaki Tarumi, Seeheim-Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 760 days.

(21) Appl. No.: 11/631,184

(22) PCT Filed: Jun. 13, 2005

(86) PCT No.: PCT/EP2005/006311
§ 371 (c)(1),
(2), (4) Date: Apr. 22, 2009

(87) PCT Pub. No.: WO2006/002747
PCT Pub. Date: Jan. 12, 2006

(65) Prior Publication Data
US 2009/0213318 A1 Aug. 27, 2009

(30) Foreign Application Priority Data
Jul. 2, 2004 (DE) ........................ 10 2004 032 325

(51) Int. Cl.
C09K 19/30 (2006.01)
C09K 19/12 (2006.01)
C09K 19/34 (2006.01)
C09K 19/02 (2006.01)
C09K 19/44 (2006.01)

(52) U.S. Cl.
CPC ............. *C09K 19/345* (2013.01); *C09K 19/02* (2013.01); *C09K 19/12* (2013.01); *C09K 19/3003* (2013.01); *C09K 19/3402* (2013.01); *C09K 19/3444* (2013.01); *C09K 19/44* (2013.01); *C09K 19/3001* (2013.01); *C09K 19/3098* (2013.01); *C09K 2019/3004* (2013.01); *C09K 2019/3016* (2013.01); *C09K 2019/3422* (2013.01)

(58) Field of Classification Search
CPC . C09K 19/12; C09K 19/3001; C09K 19/3003; C09K 19/3098; C09K 2019/12; C09K 2019/3004; C09K 2019/3016; C09K 19/3402; C09K 19/3444; C09K 19/3445; C09K 19/345; C09K 2019/3422; G02F 1/13
USPC ........... 428/1.1; 252/299.61, 299.63, 299.66, 252/299.67
See application file for complete search history.

(56) References Cited

U.S. PATENT DOCUMENTS

| 5,198,149 A | 3/1993 | Reiffenrath et al. |
|---|---|---|
| 5,266,612 A | 11/1993 | Kim et al. |
| 5,599,480 A | 2/1997 | Tarumi et al. |
| 6,066,268 A | 5/2000 | Ichinose et al. |
| 6,210,603 B1 | 4/2001 | Kondo et al. |
| 6,692,657 B1 | 2/2004 | Kato et al. |
| 6,740,369 B2 | 5/2004 | Klasen-Memmer et al. |
| 6,764,722 B2 | 7/2004 | Klasen et al. |
| 6,764,723 B2 | 7/2004 | Lee et al. |
| 6,790,489 B2 | 9/2004 | Klasen-Memmer et al. |
| 6,844,032 B2 | 1/2005 | Miyazawa et al. |
| 6,861,107 B2 | 3/2005 | Klasen-Memmer et al. |
| 6,896,939 B2 | 5/2005 | Klasen-Memmer et al. |
| 6,933,022 B2 | 8/2005 | Klasen-Memmer et al. |
| 7,026,022 B2 | 4/2006 | Klasen-Memmer et al. |
| 7,081,279 B2 | 7/2006 | Kato et al. |
| 7,211,302 B2 | 5/2007 | Manabe et al. |
| 7,335,403 B2 | 2/2008 | Klasen-Memmer et al. |
| 7,678,431 B2 | 3/2010 | Manabe et al. |
| 7,704,567 B2 | 4/2010 | Klasen-Memmer et al. |
| 2002/0014613 A1* | 2/2002 | Klasen et al. ........... 252/299.63 |
| 2003/0039769 A1* | 2/2003 | Lee et al. ................. 428/1.1 |
| 2003/0071244 A1 | 4/2003 | Klasen-Memmer et al. |
| 2003/0077405 A1 | 4/2003 | Miyazawa et al. |
| 2003/0222245 A1* | 12/2003 | Klasen-Memmer et al. ........... 252/299.66 |
| 2004/0011996 A1 | 1/2004 | Klasen-Memmer et al. |
| 2004/0041125 A1* | 3/2004 | Bremer et al. ........... 252/299.62 |
| 2004/0065866 A1 | 4/2004 | Kato et al. |
| 2004/0099842 A1* | 5/2004 | Klasen-Memmer et al. ........... 252/299.62 |

(Continued)

FOREIGN PATENT DOCUMENTS

| DE | 101 12 955 | 11/2001 |
|---|---|---|
| DE | 10218976 A1 * | 12/2002 |

(Continued)

OTHER PUBLICATIONS

Canon, Inc. "Flattening method for beryllium thin film," Patent Abstracts of Japan, Publication Date: Oct. 20, 1991; English Abstract of JP-03 244115.

(Continued)

*Primary Examiner* — Shean C Wu

(74) *Attorney, Agent, or Firm* — Millen White Zelano and Branigan, PC; Csaba Henter; Anthony Zelano

(57) ABSTRACT

The present invention relates to nematic liquid-crystal media of negative dielectric anisotropy which have a peak time ($t_{max.}$) of 0.25 ms or less, which is determined as described in the disclosure, and which preferably have a value of the quotient of the peak time and the square of the birefringence ($t_{max}/\Delta n^2$) of 22 ms or less, and to the use of these liquid-crystal media in liquid-crystal displays, and to these liquid-crystal displays.

93 Claims, No Drawings

(56) References Cited

U.S. PATENT DOCUMENTS

| | | |
|---|---|---|
| 2004/0146662 A1 | 7/2004 | Klasen-Memmer et al. |
| 2004/0171866 A1* | 9/2004 | Reiffenrath et al. ............ 560/86 |
| 2005/0121647 A1* | 6/2005 | Klasen-Memmer et al. ........................ 252/299.63 |
| 2005/0279968 A1 | 12/2005 | Manabe et al. |
| 2006/0124896 A1 | 6/2006 | Klasen-Memmer et al. |
| 2006/0177603 A1 | 8/2006 | Taugerbeck et al. |
| 2007/0080324 A1 | 4/2007 | Klasen-Memmer et al. |
| 2007/0237907 A1 | 10/2007 | Manabe et al. |

FOREIGN PATENT DOCUMENTS

| | | |
|---|---|---|
| DE | 102 29 828 | 2/2003 |
| DE | 102 16 197 | 10/2003 |
| DE | 103 29 140 | 1/2004 |
| DE | 103 40 535 | 3/2004 |
| DE | 103 54 404 | 6/2004 |
| DE | 10 2004 046 103 | 5/2005 |
| DE | 697 37 690 | 1/2008 |
| EP | 0 949 231 | 10/1999 |
| EP | 1 245 660 | 10/2002 |
| EP | 1 362 839 | 11/2003 |
| JP | 2 298423 | 12/1990 |
| JP | 3 244115 | 10/1991 |
| JP | 2000 53602 | 9/2001 |
| JP | 2001 354 967 | 12/2001 |
| JP | 2002 371 026 | 12/2002 |
| JP | 2003 119 466 | 4/2003 |
| JP | 2003 165977 | 6/2003 |
| JP | 2003 327 965 | 11/2003 |
| JP | 2004 131704 | 4/2004 |
| TW | 482 819 | 4/2002 |
| TW | 589362 | 6/2004 |
| WO | WO 89 02425 | 3/1989 |
| WO | WO 92 11241 | 7/1992 |
| WO | WO 98 23564 | 6/1998 |
| WO | WO 2004 035710 | 4/2004 |
| WO | 2004076438 A2 | 9/2004 |

OTHER PUBLICATIONS

Chisso Corp., "Fluorine substituted benzene derivative, and liquid crystal composition," Espacenet, Publication Date: Apr. 11, 2002; English Abstract of TW-482819.

Dainippon Ink & Chem Inc. "Liquid Crystal Composition", Patent Abstracts of Japan, Publication Date: Oct. 6, 2003; English Abstract of JP-2003-165977.

Honda Motor Co Ltd. "Toothed Gear Finishing Cutter and Finishing Process of Toothed Gear Using This", Patent Abstract of Japan, Publication Date: Oct. 12, 1990; English Abstract of JP2002-298423.

Merck Patent GMBH "Liquid Crystal Medium and Electrooptic Display Containing the Medium", Patent Abstract of Japan, Publication Date: Nov. 19, 2003; English Abstract of JP2003-327965.

Chisso Corp., "Alkenyl Compound Having a Negative Delta Epsilon Value, Liquid Crystal Composition, and Liquid Crystal Display Device", Espacenet, Publication Date: Jun. 1, 2004; English Abstract of TW-589362.

Chisso Corp., "Liquid Crystal Compound Having Bis(Trifluoromethyl) Phenyl Ring, Liquid Crystal Composition, and Liquid Crystal Display Element", Patent Abstract of Japan, Publication Date: Dec. 26, 2002; English Abstract of JP2002-371026.

Chisso Corp., "Alkenyl Compound Having Minus Delta Epsilon Value, Liquid Crystal Composition and Liquid Crystal Indication Element", Patent Abstract of Japan, Publication Date: Feb. 22, 2000; English Abstract of JPP2000-053602.

Merck Patent GMBH, "Liquid Crystal Medium", Patent Abstract of Japan, Publication Date: Jan. 25, 2001; English Abstract of JP2001-354967.

Merck Patent GMBH, "Liquid Crystal Medium", Patent Abstraction of Japan, Publication Date: Apr. 30, 2004; English Abstract of JP2004-131704.

Search Report Corresponding to EP 05 748 085.7 dated Sep. 7, 2016.

* cited by examiner

LIQUID CRYSTAL MEDIUM AND ELECTROOPTICAL DISPLAY CONTAINING SAME

The present invention relates to liquid-crystal media and to the use thereof in liquid-crystal displays, and to these liquid-crystal displays, particularly liquid-crystal displays which use the ECB (electrically controlled birefringence) effect with dielectrically negative liquid crystals in a homeotropic starting alignment. The liquid-crystal media according to the invention are distinguished by a particularly low response time in the displays according to the invention at the same time as a high voltage holding ratio.

Displays which use the ECB effect have become established as so-called VAN (vertically aligned nematic) displays in the MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9 and Liu, C. T. et al., Paper 15.1: "A 46-inch TFT-LCD HDTV Technology . . . ", SID 2004 International Symposium, Digest of Technical Papers, XXXV, Book II, pp. 750 to 753) and PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) designs besides ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757) displays and IPS (in plane switching) displays (for example: Yeo, S. D., Paper 15.3: "A LC Display for the TV Application", SID 2004 International Symposium, Digest of Technical Papers, XXXV, Book II, pp. 758 & 759), besides the long-known displays, as one of the three more recent types of liquid-crystal display that are currently the most important besides TN (twisted nematic) displays, in particular for television applications. In general form, the technologies are compared, for example, in Souk, Jun, SID Seminar 2004, Seminar M-6: "Recent Advances in LCD Technology", Seminar Lecture Notes, M-6/1 to M-6/26 and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular for the switching of grey shades, is still a problem which has not yet been solved to a satisfactory extent.

ECB displays, like ASV displays, use liquid-crystalline media of negative dielectric anisotropy ($\Delta\epsilon$), whereas TN and to date all conventional IPS displays use liquid-crystalline media of positive dielectric anisotropy.

In liquid-crystal displays of this type, the liquid crystals are used as dielectrics, whose optical properties change reversibly on application of an electric voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the greatest possible value of the dielectric anisotropy. In general, at most relatively small proportions of neutral compounds and if possible no compounds having the opposite sign of the dielectric anisotropy to the medium are employed. In the case of liquid-crystal media of negative dielectric anisotropy for ECB displays, predominantly compounds of negative dielectric anisotropy are thus employed. The liquid-crystal media employed generally consist predominantly and usually even essentially of liquid-crystal compounds of negative dielectric anisotropy.

In the media used in accordance with the present application, at most significant amounts of dielectrically neutral liquid-crystal compounds and generally only very small amounts or even no dielectrically positive compounds are typically employed, since in general the liquid-crystal displays are intended to have the lowest possible addressing voltages.

The liquid-crystal media of the prior art having correspondingly low addressing voltages have relatively low electrical resistances or a low voltage holding ratio and result in undesirably high power consumptions in the displays.

In addition, the addressing voltage of the displays of the prior art is often too great, in particular for displays which are not connected directly or not continuously to the power supply network, such as, for example, displays for mobile applications.

In addition, the phase range must be sufficiently broad for the intended application.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

There is therefore a great demand for liquid-crystal media which do not have the disadvantages of the media from the prior art, or at least do so to a significantly reduced extent.

Surprisingly, it has been found that it has been possible to achieve liquid-crystal displays which have a short response time in ECB displays and at the same time have a sufficiently broad nematic phase, favourable birefringence ($\Delta n$) and a high voltage holding ratio.

In accordance with the present invention, the short response time of the displays is preferably achieved by using liquid-crystal media according to the invention which have a low value of 0.25 ms or less for the peak times t ($t_{max}$) calculated by the method explained below.

The quotient of the peak time and the square of the birefringence of the liquid-crystal mixture ($t_{max}/\Delta n^2$) of the liquid-crystal media according to the invention is preferably 22 ms or less. This quotient ($t_{max}/\Delta n^2$), which takes into account the effect of the optimum layer thickness of the liquid-crystal displays, is proportional to the response time of the liquid-crystal mixtures in the corresponding displays.

For the purposes of the present invention, the peak time ($t_{max}$) is the time which passes before current flowing through the cell after application of a short, high voltage pulse to a cell filled with liquid crystal passes through a maximum in its time curve (I(t)). It is determined as follows in accordance with the present invention. Firstly, the time curve of the current (I(t)) or the current density (I(t)/S) is calculated in accordance with the following equations (1) and (2), where equation (1) describes the current as a function of the tilt angle of the liquid-crystal director and equation (2) describes the correlation between the tilt angle and the time that has passed after application of the voltage.

Equation (1)
$$I_{(\theta_b)} = \frac{S(2\alpha_1 \sin^2\theta_b \cos^2\theta_b - \gamma_2 \cos 2\theta_b + \gamma_3)(\epsilon_0 \Delta\epsilon \sin 2\theta_b)^2 E_b^3}{(\alpha_1\gamma_1 + \gamma_2^2)\sin^2 2\theta_b - \gamma_1^2 - \gamma_2^2 + 2\gamma_1\gamma_3}$$

Equation (2)
$$t(\theta_b) = \frac{\beta_2}{2\epsilon_0 \Delta\epsilon E_b^2 \beta_3} \left\{ -\ln\left(\frac{\tan\theta_b}{\tan\theta_0}\right) + \frac{-\beta_5 + \gamma_2\sqrt{\beta_1}}{2\beta_4\sqrt{\beta_1}} \right.$$
$$\ln\left(\frac{\beta_4\tan^2\theta_b + \beta_7 + \sqrt{\beta_1}}{\beta_4\tan^2\theta_0 + \beta_7 + \sqrt{\beta_1}}\right) + \frac{\beta_5 + \gamma_2\sqrt{\beta_1}}{2\beta_4\sqrt{\beta_1}}$$
$$\left. \ln\left(\frac{\beta_4\tan^2\theta_b + \beta_7 - \sqrt{\beta_1}}{\beta_4\tan^2\theta_0 + \beta_7 - \sqrt{\beta_1}}\right) \right\} + \frac{\beta_6}{2\epsilon_0 \epsilon E_b^2 \sqrt{\beta_1}}$$
$$\ln\left[\frac{(\alpha_1\cos 2\theta_b + \gamma_2 + \sqrt{\beta_1})(\alpha_1\cos 2\theta_0 + \gamma_2 - \sqrt{\beta_1})}{(\alpha_1\cos 2\theta_b + \gamma_2 - \sqrt{\beta_1})(\alpha_1\cos 2\theta_0 + \gamma_2 + \sqrt{\beta_1})}\right]$$

where:
S=electrode area (this is not necessary for determination of the maximum of I(t)),
$E_b$=U/l (U=90 V and l=22 μm assumed for the calculations for the present invention),
$\theta_0$=bulk tilt angle at time t=0
$\theta_b$=bulk tilt angle
$\alpha_1$ to $\alpha_5$=Leslie viscosity coefficients, $\beta_1 = \alpha_1^2 + \gamma_2^2 + 2\alpha_1\gamma_3$, $\beta_2 = \gamma_1^2 + \gamma_2^2 - 2\gamma_1\gamma_3$, $\beta_3 = \gamma_2 - \gamma_3$ $\beta_4 = \gamma_2 + \gamma_3$, $\beta_5 = \gamma_2^2 + \alpha_1\gamma_3$, $\beta_6 = \alpha_1\gamma_1 + \gamma_2^2$, $\beta_7 = \alpha_1 + \gamma_3$ $\gamma_1 = -\alpha_2$; (rotational viscosity), $\gamma_2 = \alpha_3 - \alpha_2$ and $\gamma_3 = \alpha_3 + \alpha_4 + \alpha_5$.

For the Leslie viscosity coefficients, the following assumptions are used for the present invention:

$\alpha_1 = -10$ mPas and $\alpha_3 = 0$ mPas.

In addition, for $\alpha_3 = 0$ in accordance with Parodi:

$\alpha_4 + \alpha_5 = -\alpha_2 + 2\eta_2$ i.e.

$\alpha_4 + \alpha_5 = \gamma_1 + 2\eta_2$.

The following is additionally assumed here:

$\eta_2 \approx \rho \cdot v$ where:
ρ=density (about 1 g/cm³) and
ν=flow viscosity.

The position of the maximum $t_{max}$ of the function I(t) or I($\theta_b$(t)) can be determined in various ways. Thus, for example, the function I(t) can be calculated numerically and the value and position of the maximum selected numerically or determined graphically. For the purposes of the present invention, numerical methods are preferred, and particular preference is given to the use of corresponding mathematics software Mathematica (for example: version 3) from Wolfram Research, Inc., into which an implicit representation of I(t) is entered, and the maximum of I(t) is determined numerically via derivation of the function after time (dI/dt).

The liquid-crystal media according to the invention have a value of the peak time ($t_{max}$) of 0.25 ms or less, particularly preferably of 0.20 ms or less, still more preferably of 0.16 ms or less, very particularly preferably of 0.13 ms or less and especially preferably of 0.12 ms or less.

For a Δn of 0.080±0.010, the value $t_{max}$ of the liquid-crystal media according to the invention is preferably 0.18 ms or less, particularly preferably 0.16 ms or less, still more preferably 0.14 ms or less, very particularly preferably 0.12 ms or less and especially preferably 0.10 ms or less.

For a Δn of 0.100±0.010, the value $t_{max}$ of the liquid-crystal media according to the invention is preferably 0.19 ms or less, particularly preferably 0.17 ms or less, still more preferably 0.15 ms or less, very particularly preferably 0.13 ms or less and especially preferably 0.12 ms or less.

For a Δn of 0.120±0.010, the value $t_{max}$ of the liquid-crystal media according to the invention is preferably 0.20 ms or less, particularly preferably 0.18 ms or less, still more preferably 0.16 ms or less, very particularly preferably 0.14 ms or less and especially preferably 0.13 ms or less.

For a Δn of 0.150±0.020, the value $t_{max}$ of the liquid-crystal media according to the invention is preferably 0.21 ms or less, particularly preferably 0.20 ms or less, still more preferably 0.18 ms or less, very particularly preferably 0.16 ms or less and especially preferably 0.15 ms or less.

For a Δn of 0.200±0.030 the value $t_{max}$ of the liquid-crystal media according to the invention is preferably 0.25 ms or less, particularly preferably 0.22 ms or less, still more preferably 0.20 ms or less, very particularly preferably 0.19 ms or less and especially preferably 0.18 ms or less.

Since different values of the optical retardation (d·Δn) are in some cases required for the particular applications of the liquid-crystal media in the various display types or designs and the response time in the case of most electro-optical effects is inversely proportional to the square of the layer thickness of the liquid-crystal cells (d), a further parameter for characterisation of the corresponding liquid-crystal media is the quotient of the calculated peak time ($t_{max}$) and the square of the birefringence (Δn), i.e.: $t_{max}/\Delta n^2$.

The liquid-crystal media according to the invention preferably have a value Of $t_{max}/\Delta n^2$ of 22 ms or less, particularly preferably of 20 ms or less, still more preferably of 18 ms or less, very particularly preferably of 16 ms or less and especially of 15 ms or less.

For an average dielectric constant ($\epsilon_{av.}$) of 4.0±0.5, the value $t_{max}/\Delta n^2$ of the liquid-crystal media according to the invention is preferably 18 ms or less, particularly preferably 16 ms or less, still more preferably 14 ms or less, very particularly preferably 12 ms or less and especially preferably 10 ms or less.

For an $\epsilon_{av.}$ of 5.0±0.5, the value $t/\Delta n^2$ of the liquid-crystal media according to the invention is preferably 19 ms or less, particularly preferably 17 ms or less, still more preferably 15 ms or less, very particularly preferably 13 ms or less and especially preferably 12 ms or less.

For an $\varepsilon_{av.}$ of 6.0±0.5, the value $t/\Delta n^2$ of the liquid-crystal media according to the invention is preferably 22 ms or less, particularly preferably 20 ms or less, still more preferably 18 ms or less, very particularly preferably 16 ms or less and especially preferably 14 ms or less.

For an $\varepsilon_{av.}$ of 7.0±0.5, the value $t/\Delta n^2$ of the liquid-crystal media according to the invention is preferably 24 ms or less, particularly preferably 22 ms or less, still more preferably 20 ms or less, very particularly preferably 17 ms or less and especially preferably 14 ms or less.

For an $\varepsilon_{av.}$ of 8.0±0.5, the value $t/\Delta n^2$ of the liquid-crystal media according to the invention is preferably 26 ms or less, particularly preferably 23 ms or less, still more preferably 21 ms or less, very particularly preferably 19 ms or less and especially preferably 16 ms or less.

The present invention likewise relates to liquid-crystal displays which contain or use the liquid-crystal media according to the invention. These displays can be addressed directly, by means of a time multiplex method or by means of an active matrix, for example by TFTs (thin film transistors), varistors or diodes. Preference is given to displays with active matrix addressing.

In addition, the present invention relates to the corresponding process for reducing the response time of the displays.

The liquid-crystal media according to the invention preferably comprise a) a dielectrically negative, liquid-crystalline component (component A), which preferably comprises one or more dielectrically negative compound(s) of the formula

I in which at least one of

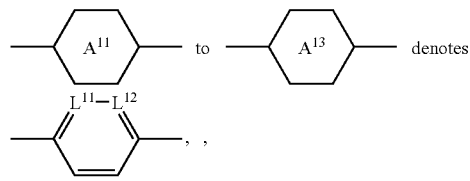

to denotes and the others, if present, in each case, independently of one another, have the same meaning or denote

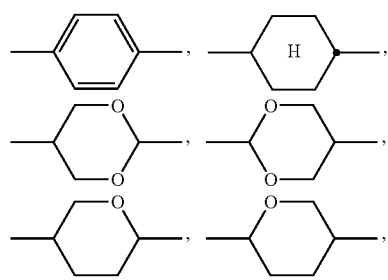

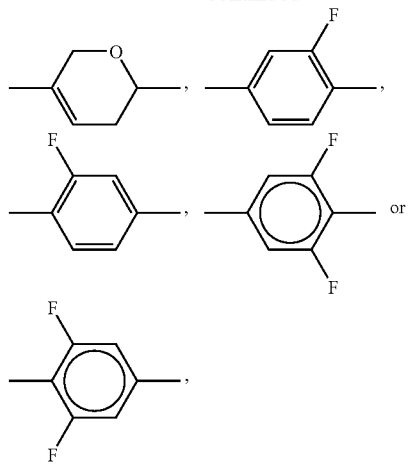

preferably, independently of one another,

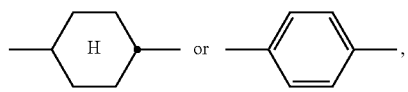

particularly preferably

denotes

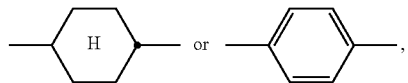

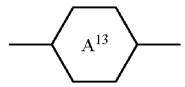

and/or, if present,

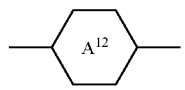

denote

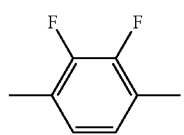

$R^{11}$ and $R^{12}$, independently of one another, denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, $L^{11}$ and $L^{12}$, independently of one another, denote C—F or N, preferably at least one of $L^{11}$ and $L^{12}$ denotes C—F, particularly preferably $L^{11}$ and $L^{12}$ both denote C—F, $Z^{11}$ and $Z^{12}$, in each case independently of one another, denote —$CH_2$—$CH_2$—, —C≡C—, —CH=CH—, —CF=CF—, —CF=CH—, —CH=CF—, —$CH_2$—$CF_2$—, —$CF_2$—$CH_2$—, —$CF_2$—$CF_2$—, —CO—O—, —O—CO—, —$OCH_2$—, —$CH_2O$—, —$OCF_2$, —$CF_2O$— or a single bond, preferably —$CH_2$—$CH_2$—, —CH=CH—, —$CH_2$—$CF_2$—, —$CF_2$—$CH_2$—, —$CF_2$—$CF_2$—, —$OCH_2$—, —$CH_2O$—, —$OCF_2$, —$CF_2O$— or a single bond, particularly preferably one of $Z^{11}$ and $Z^{12}$ denotes —$CH_2$—$CH_2$— or a single bond and the other denotes a single bond, particularly preferably both denote a single bond, and n denotes 0, 1 or 2, preferably 0 or 1,
and b) a dielectrically neutral, liquid-crystalline component (component B), which preferably comprises one or more dielectrically neutral compound(s) of the formula II

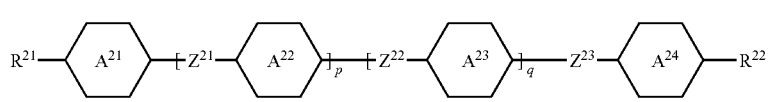

II in which $R^{21}$ and $R^{22}$, in each case independently of one another, have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy, $Z^{21}$ to $Z^{23}$, in each case independently of one another, have one of the meanings given for $Z^{11}$ and $Z^{12}$ and preferably denote —$CH_2$—$CH_2$—, —CH=CH—, —C≡C—, —COO— or a single bond, preferably —$CH_2$—$CH_2$— or a single bond and particularly preferably a single bond,

 to 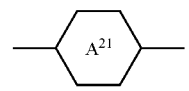, in each case independently of one another, denote

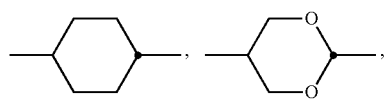

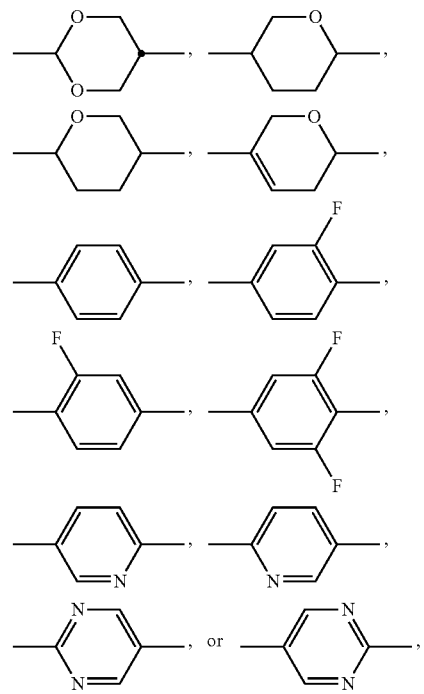

preferably

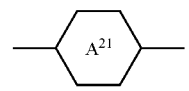

and

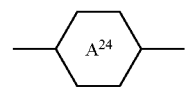

denote

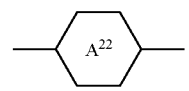, and, if present,

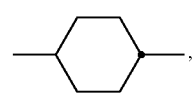

denotes

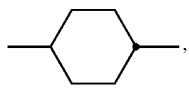

p and q, in each case independently of one another, denote 0 or 1, preferably (p+q) denotes 0 or 1, particularly preferably q denotes 0 and especially preferably p and q both denote 0, and optionally c) a chiral component (component C) which comprises one or more chiral compounds.

In a preferred embodiment, the medium comprises one or more compounds of the formula I, selected from the group of the compounds of the formulae I-1 to I-5

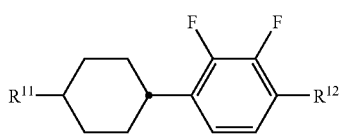

I-1

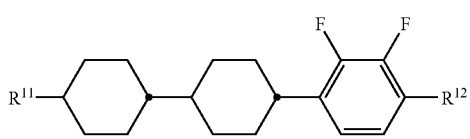

I-2

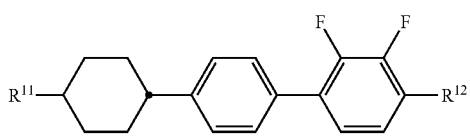

I-3

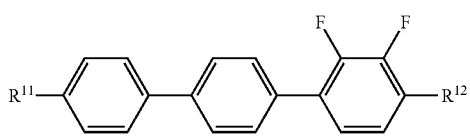

I-4

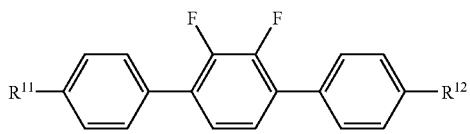

I-5 in which the parameters have the respective meaning indicated above for the formula I and preferably $R^{11}$ denotes alkyl or alkenyl and $R^{12}$ denotes alkyl, alkenyl, alkoxy or alkenyloxy.

In a further preferred embodiment, the medium comprises one or more compounds of the formula I-1, selected from the group of the compounds of the formulae I-1a to I-1d, preferably of the formulae I-1b and/or I-1d, particularly preferably of the formula I-1d,

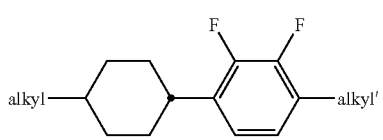

I-1a

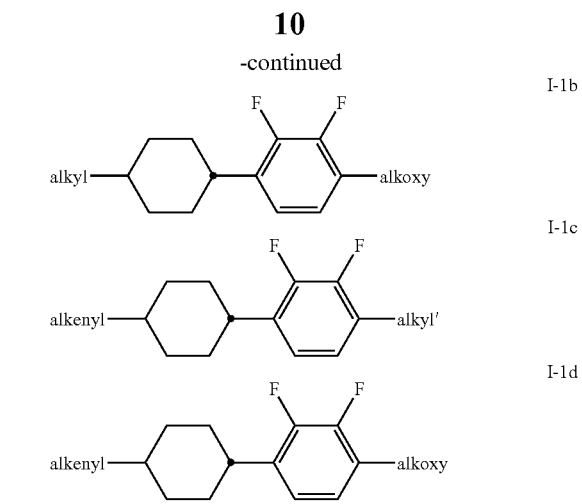

in which alkyl and alkyl', independently of one another, denote alkyl having 1 to 7 C atoms, preferably having 2 to 5 C atoms alkoxy denotes alkoxy having 1 to 7 C atoms, preferably having 2 to 4 C atoms, and alkenyl denotes alkenyl having 2 to 7 C atoms, preferably having 2 to 5 C atoms.

In a further preferred embodiment, the medium comprises one or more compounds of the formula I-2, selected from the group of the compounds of the formulae I-2a to I-2d, preferably of the formulae I-2a and/or I-2b, particularly preferably of the formula I-2b,

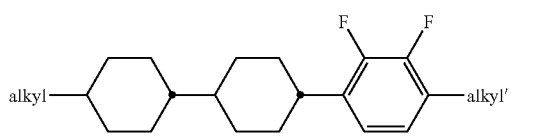

I-2a

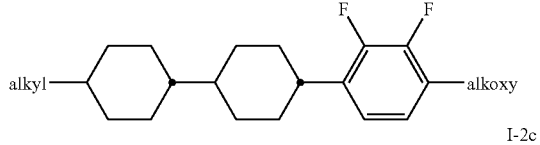

I-2b

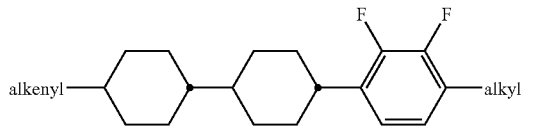

I-2c

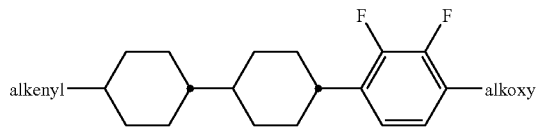

I-2d in which alkyl and alkyl', independently of one another, denote alkyl having 1 to 7 C atoms, preferably having 2 to 5 C atoms alkoxy denotes alkoxy having 1 to 7 C atoms, preferably having 2 to 4 C atoms, and alkenyl denotes alkenyl having 2 to 7 C atoms, preferably having 2 to 5 C atoms.

In a further preferred embodiment, the medium comprises one or more compounds of the formula I-3, selected from the group of the compounds of the formulae I-3a to I-3d, preferably of the formulae I-3b and/or I-3d, I-3a
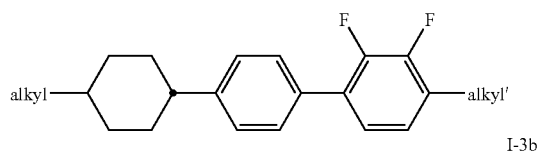

I-3b
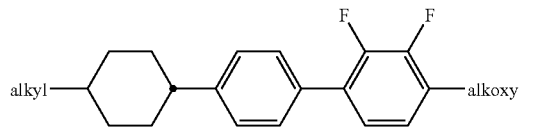

I-3c
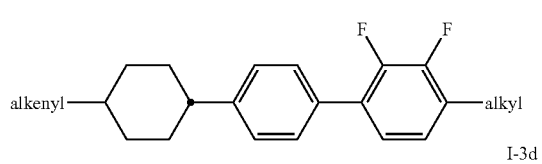

I-3d
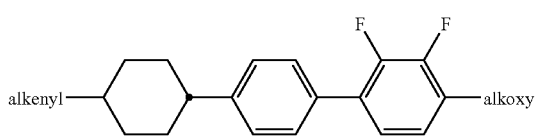

in which
alkyl and alkyl', independently of one another, denote alkyl having 1 to 7 C atoms, preferably having 2 to 5 C atoms
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula I-4, selected from the group of the compounds of the formulae I-4a to I-4d, preferably of the formulae I-4a and/or I-4c, particularly preferably of the formula I-4a, I-4a
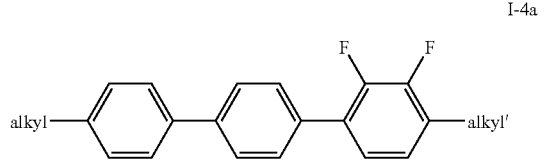

I-4b
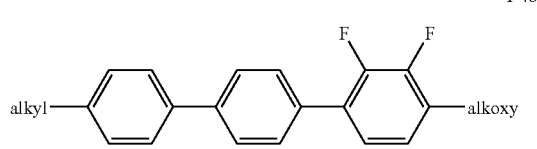

I-4c
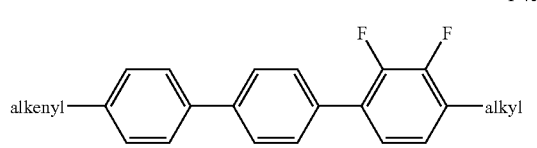

I-4d
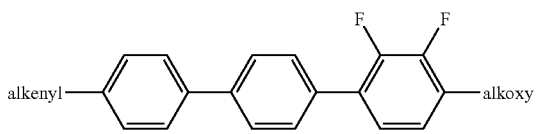

in which
alkyl and alkyl', independently of one another, denote alkyl having 1 to 7 C atoms, preferably having 2 to 5 C atoms
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula I-5, selected from the group of the compounds of the formulae I-5a to I-5d, preferably of the formulae I-5a and/or I-5c, particularly preferably of the formula I-5a, I-5a
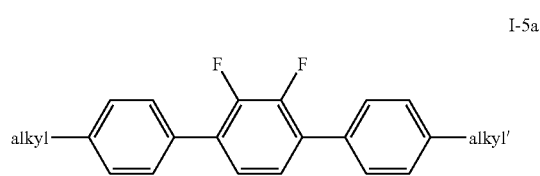

I-5b
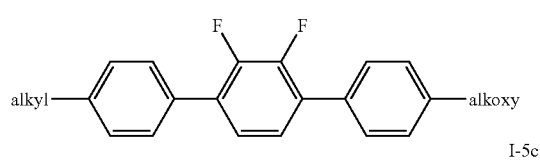

I-5c
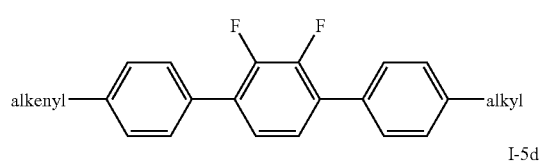

I-5d
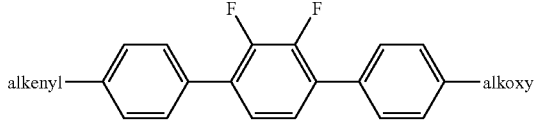

in which
alkyl and alkyl', independently of one another, denote alkyl having 1 to 7 C atoms, preferably having 2 to 5 C atoms
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula II from the group of the compounds of the formulae II-1 to II-8, preferably selected from the group of the compounds of the formulae II-1 to II-6, preferably from the group II-1 to II-4 and particularly preferably from the group II-2 and II-3,

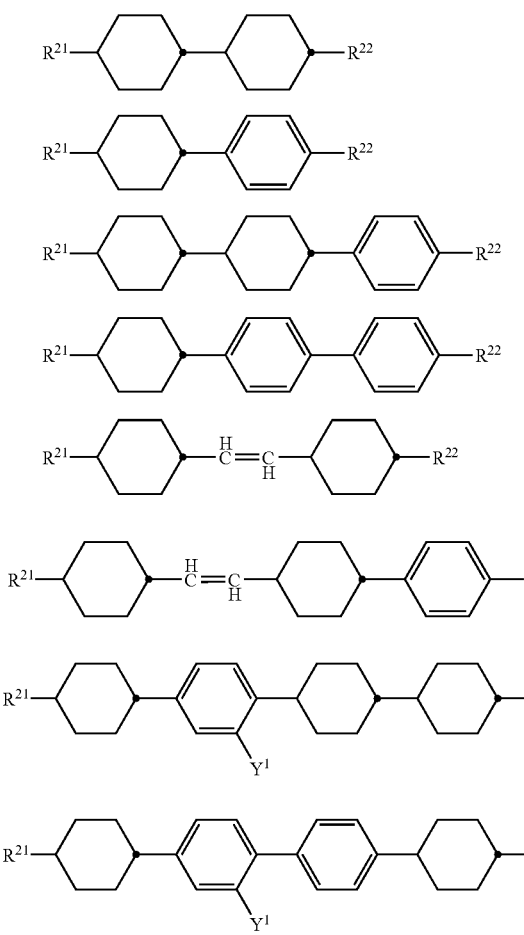

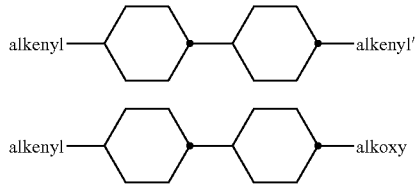

in which the parameters have the respective meaning indicated above for the formula II, and
Y$^1$ denotes H or F, and
preferably
R$^{21}$ denotes alkyl or alkenyl and
R$^{22}$ denotes alkyl, alkenyl or alkoxy, preferably alkyl or alkenyl, particularly preferably alkenyl.

In a further preferred embodiment, the medium comprises one or more compounds of the formula II-1, selected from the group of the compounds of the formulae II-1a to II-1e, preferably of the formulae II-1a and/or II-1c and/or II-1d, particularly preferably of the formulae II-1c and/or II-1d and very particularly preferably of the formula II-1c and of the formula II-1d,

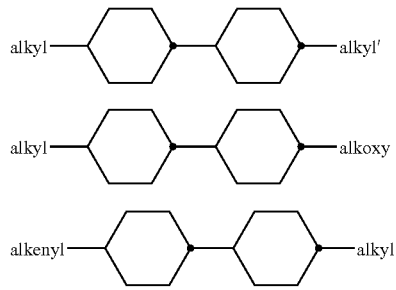

in which
alkyl and alkyl', independently of one another, denote alkyl having 1 to 7 C atoms, preferably having 2 to 5 C atoms
alkoxy denotes alkoxy having 1 to 5 C atoms, preferably having 2 to 4 C atoms, and
alkenyl and alkenyl', independently of one another, denote alkenyl having 2 to 7 C atoms, preferably having 2 to 5 C atoms.

In a further preferred embodiment, the medium comprises one or more compounds of the formula II-2, selected from the group of the compounds of the formulae II-2a to II-2d, preferably of the formulae II-2a and/or II-2b, particularly preferably of the formula II-2b,

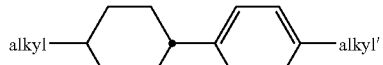

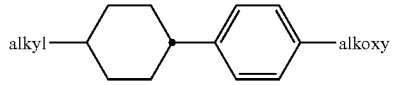

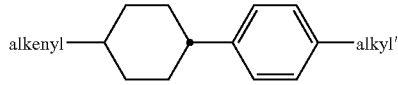

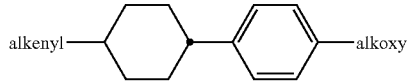

in which
alkyl and alkyl', independently of one another, denote alkyl having 1 to 7 C atoms, preferably having 2 to 5 C atoms
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula II-3, selected from the group of the compounds of the formulae II-3a to II-3d, preferably of the formulae II-3a and/or II-3d, particularly preferably of the formula II-3d,

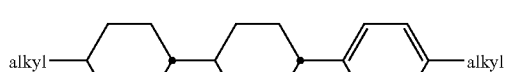

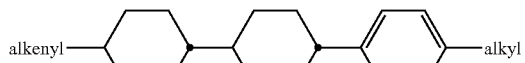

-continued

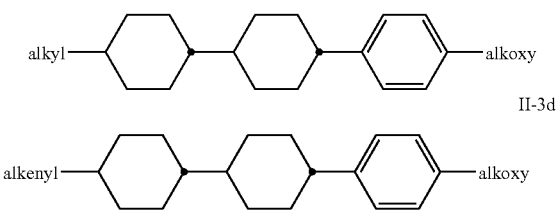

in which
alkyl and alkyl', independently of one another, denote alkyl having 1 to 7 C atoms, preferably having 2 to 5 C atoms
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula II-4 selected from the group of the compounds of the formulae II-4a to II-4d, preferably of the formulae II-4a and/or II-4d, particularly preferably of the formula II-4d,

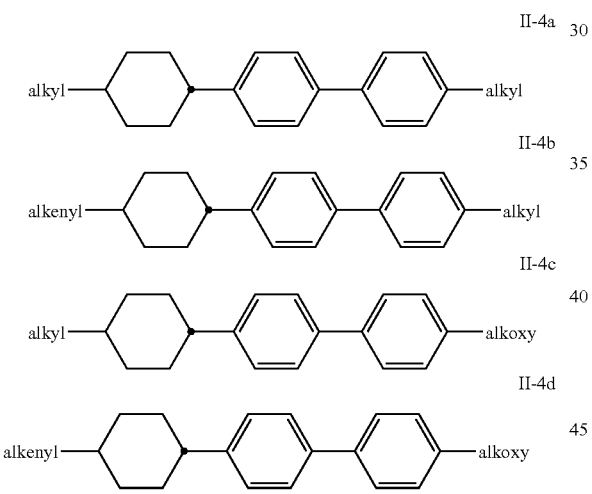

in which
alkyl and alkyl', independently of one another, denote alkyl having 1 to 7 C atoms, preferably having 2 to 5 C atoms
alkoxy denotes alkoxy having 1 to 5 C atoms, preferably having 2 to 4 C atoms, and
alkenyl denotes alkenyl having 2 to 7 C atoms, preferably having 2 to 5 C atoms.

The medium particularly preferably comprises one or more compound(s) of the formula II-1, selected from the group
of the formulae II-1c, especially preferably
of the formula II-1 in which $R^{21}$ denotes vinyl or 1-propenyl and $R^{22}$ denotes alkyl, preferably n-alkyl, particularly preferably $R^{21}$ denotes vinyl and $R^{22}$ denotes propyl, and
of the formula II-1d, especially preferably
of the formula II-1 in which $R^{21}$ and $R^{22}$, independently of one another, denote vinyl or 1-propenyl, preferably $R^{21}$ denotes vinyl and particularly preferably $R^{21}$ and $R^{22}$ denote vinyl.

In a preferred embodiment, the medium comprises one or more compounds of the formula II-3, especially preferably one or more compound(s) in which $R^{21}$ denotes vinyl or 1-propenyl and $R^{22}$ denotes alkyl, preferably n-alkyl, particularly preferably $R^{21}$ denotes vinyl and $R^{22}$ denotes methyl.

In a preferred embodiment, the medium comprises one or more compounds of the formula II-5, especially preferably one or more compound(s) in which $R^{21}$ denotes alkyl, vinyl or 1-propenyl and $R^{22}$ denotes alkyl, preferably n-alkyl.

For the present invention, in connection with the detailing of the constituents of the compositions:

comprise: means that the concentration of the constituents in question in the composition is preferably 10% or more, particularly preferably 20% or more, consist predominantly of: means that the concentration of the constituents in question in the composition is preferably 50% or more, particularly preferably 55% or more and very particularly preferably 60% or more, consist essentially completely of: means that the concentration of the constituents in question in the composition is preferably 80% or more, particularly preferably 90% or more and very particularly preferably 95% or more, and consist virtually completely of: means that the concentration of the constituents in question in the composition is preferably 98% or more, particularly preferably 99% or more and very particularly preferably 100.0%.

This applies both to the media as compositions with their constituents, which can be components and compounds, and to the components with their constituents, the compounds.

Component A preferably consists predominantly, particularly preferably essentially completely and very particularly preferably virtually completely, of one or more compounds of the formula I, preferably selected from the group of the compounds of the formulae I-1 to I-5 and very particularly preferably selected from the group of the compounds of the formulae I-1a to I-5d.

Component B preferably consists predominantly, particularly preferably essentially completely and very particularly preferably virtually completely, of one or more compounds of the formula II, preferably selected from the group of the compounds of the formulae II-1 to II-6, particularly preferably selected from the group of the compounds of the formulae II-1 to II-4 and very particularly preferably selected from the group of the compounds of the formulae II-1a to II-4d.

The chiral compound or the chiral compounds which can be used in component C of the liquid-crystal media in accordance with the present invention are selected from the known chiral dopants. Component C preferably consists predominantly, particularly preferably essentially completely and very particularly preferably virtually completely, of one or more compounds selected from the group of the compounds of the following formulae III to V

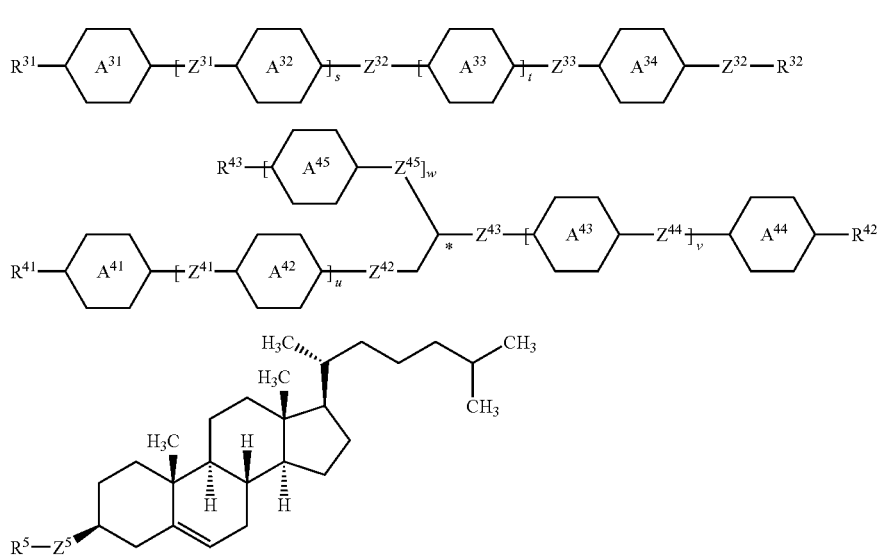

III

IV

V in which $R^{31}$ to $R^{43}$ and $R^5$, in each case independently of one another, have the meaning given above for $R^{21}$ under the formula II, and alternatively denote H, CN, F, Cl $CF_3$, $OCF_3$, $CF_2H$ or $OCF_2H$, and at least one of $R^{31}$ and $R^{32}$ denotes a chiral group, $Z^{31}$ to $Z^{53}$ and $Z^5$, in each case independently of one another, denote —$CH_2CH_2$—, —CH=CH—, —COO—, —O—CO— or a single bond, preferably $Z^{31}$, $Z^{32}$, $Z^{41}$, $Z^{44}$ and $Z^{45}$ denote a single bond, $Z^{33}$, $Z^{42}$ and $Z^{43}$ denote —COO— or a single bond, $Z^{42}$ preferably denotes —COO—, and $Z^{43}$ and $Z^5$ denote —O—CO—,

in each case independently of one another, denote

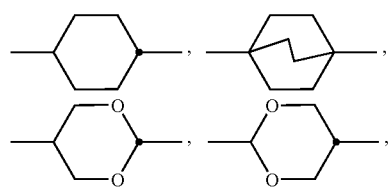

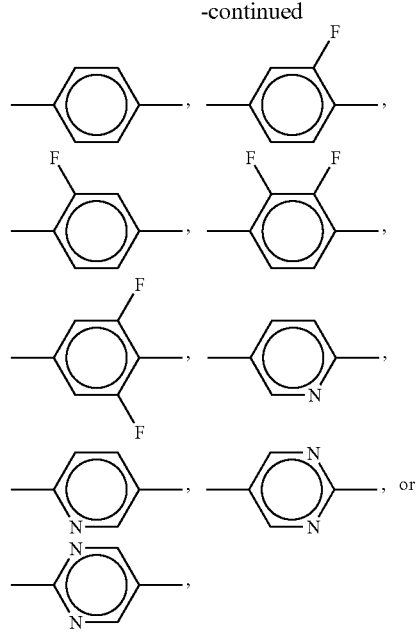

s, t, u, v, and w, in each case independently of one another, denote 0 or 1, preferably s and t both denote 0 and u and v both denote 1.

The compounds of the formulae III to V are preferably selected from the group of the compounds of the formulae III-1 to III-3, IV-1 and IV-2 or V-1 and V-2,

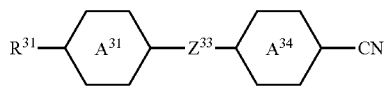

III-1

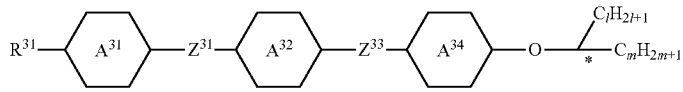

III-2

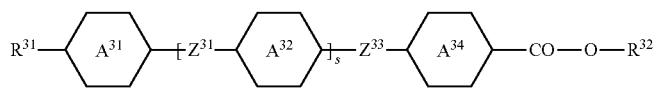

III-3

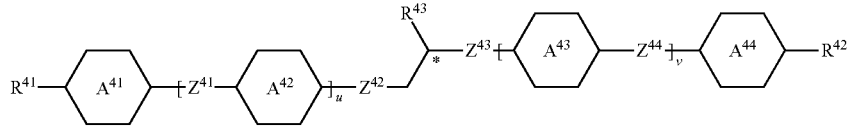

IV-1

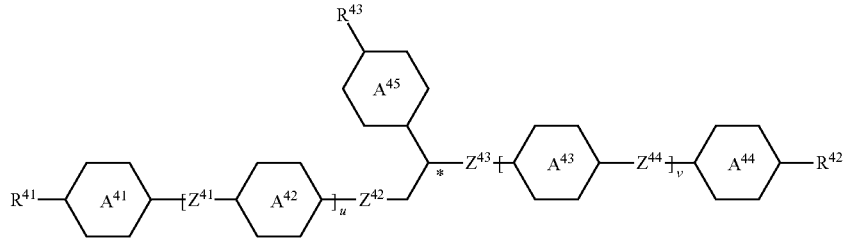

IV-2

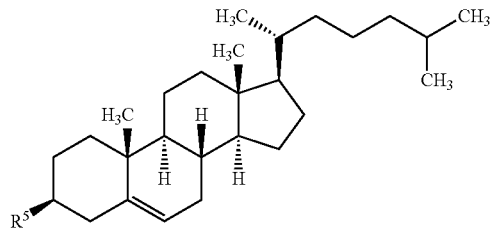

V-1

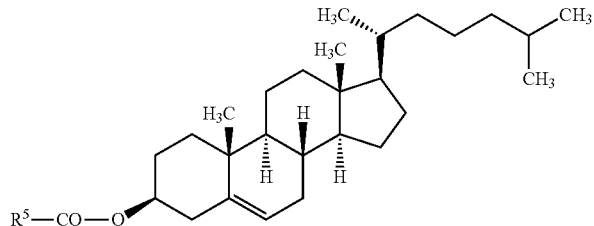

V-2 in which the parameters in each case have the meaning given above under the formulae III to V and preferably $R^{31}$ to $R^5$ denote alkyl, alkenyl or alkoxy, H, CN, F, Cl, $CF_3$, $OCF_3$, $CF_2H$ or $OCF_2H$, and at least one of $R^{31}$ and $R^{32}$ denotes a chiral group, preferably isooctyloxy, $Z^{31}$ denotes a single bond, $Z^{33}$ in the formula III-2 denotes a single bond and in the formula III-3 denotes —COO—, $Z^{42}$ denotes —COO—, $Z^{43}$ denotes —O—CO—, m denotes an integer from 1 to 8, preferably 6, and l denotes an integer from 0 to 8, preferably 1, which is different from m.

The compounds are especially preferably selected from the group of the compounds of the following formulae III-1a, III-1b, III-2a to III-2c and III-3a, IV-1a and IV-2a or V-1a and V-2a

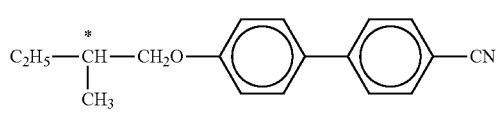

III-1a

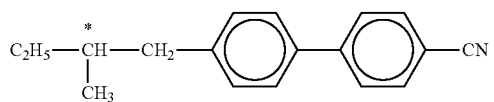

III-1b

III-2a
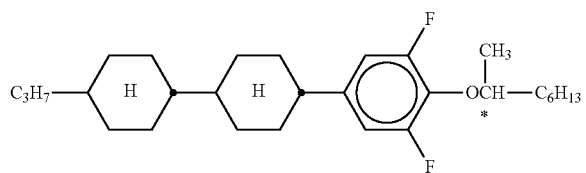
III-2b
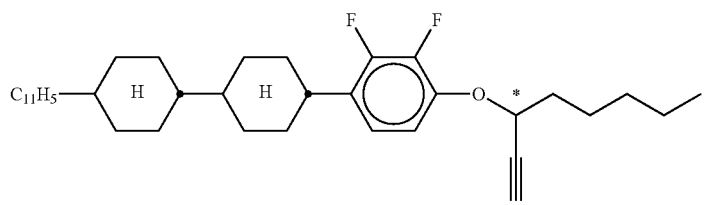
III-2c
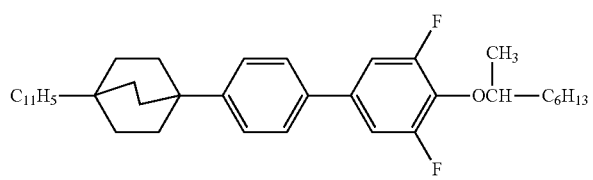
III-3a
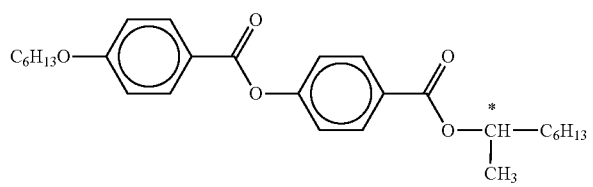
IV-1a
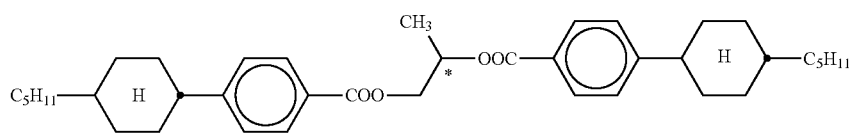
IV-1b
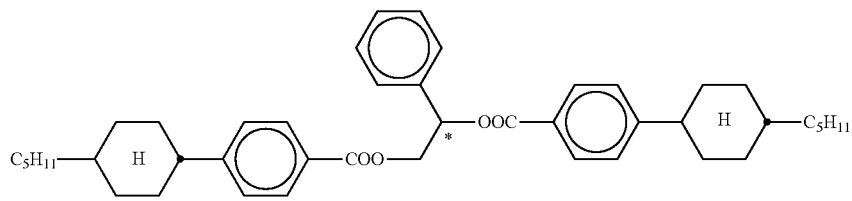
V-1a
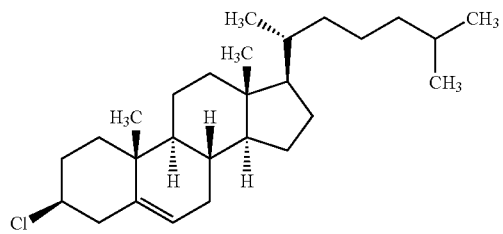
V-2a
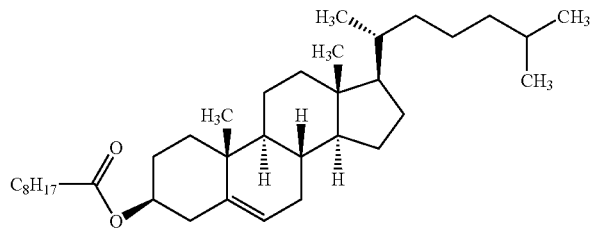

In a preferred embodiment, the liquid-crystal media according to the invention comprise in total, based on the mixture as a whole, 30% or more to 85% or less, preferably 40% or more to 80% or less, preferably 50% or more to 70% or less and particularly preferably 60% or more to 70% or less and very particularly preferably 65% or more to 69% or less, of component A, preferably of compounds of the formula I, and 15% or more to 70% or less, preferably 20% or more to 60% or less, particularly preferably 30% or more to 50% or less and very particularly preferably 35% or more to 45% or less, of component B, preferably of compounds of the formula II, and 0% or more to 15% or less, preferably 0% or more to 10% or less, particularly preferably 0.1% or more to 6% or less and very particularly preferably 1% or more to 5% or less, of component C, preferably of compounds selected from the group of the formulae III to V.

In a further preferred embodiment, the liquid-crystal media according to the invention comprise in total, based on the mixture as a whole, 25% or more to 45% or less, preferably 30% or more to 40% or less, particularly preferably 32% or more to 39% or less and very particularly preferably 33% or more to 37% or less, of compounds of the formula I-1, 15% or more to 45% or less, preferably 18% or more to 32% or less, particularly preferably 20% or more to 30% or less and very particularly preferably 21% or more to 25% or less, of compounds of the formula I-2, 0% or more to 30% or less, preferably 5% or more to 25% or less, particularly preferably 10% or more to 20% or less and very particularly preferably 13% or more to 18% or less, of compounds of the formula I-3, 0% or more to 20% or less, preferably 0% or more to 15% or less, particularly preferably 0% or more to 10% or less and very particularly preferably 0% or more to 5% or less, of compounds selected from the group of the formulae I-4 and I-5, preferably of the formula I-4, 15% or more to 45% or less, preferably 20% or more to 40% or less, particularly preferably 25% or more to 37% or less and very particularly preferably 30% or more to 35% or less, of compounds selected from the group of the formulae II-1 and II-5, preferably of the formula II-5, 0% or more to 20% or less, preferably 0% or more to 15% or less, particularly preferably 0% or more to 10% or less and very particularly preferably 0% or more to 5% or less, of compounds selected from the group of the formulae II-2 and II-4, preferably of the formula II-4, and 0% or more to 20% or less, preferably 0% or more to 15% or less, particularly preferably 1% or more to 12% or less and very particularly preferably 3% or more to 8% or less of compounds selected from the group of the formulae II-3 and II-6, preferably of the formula II-6.

In a preferred embodiment, the liquid-crystal mixture according to the invention comprises in total 1% or more to 40% or less, preferably 3% or more to 30% or less, particularly preferably 5% or more to 25% or less and very particularly preferably 10% or more to 20% or less, of compounds selected from the group of the formulae III, IV and V.

Here, as throughout the present disclosure and the claims, the term "compounds", also written as "compound(s)", denotes both one and a plurality of compounds, unless explicitly stated otherwise.

The individual compounds are employed in the mixtures in concentrations of in each case 1% or more to 30% or less, preferably 2% or more to 30% or less and particularly preferably 4% or more to 16% or less.

In a preferred embodiment, the liquid-crystal media especially preferably in each case comprise in total
29% to 38% of compounds of the formula I-1,
14% to 28% of compounds of the formula I-2,
3% to 17% of compounds of the formula I-3,
0% to 5% of compounds of the formula I-4,
0% to 5% of compounds of the formula I-5,
28% to 42% of compounds of the formula II-1 and II-4,
0% to 5% of compounds of the formula II-2 and II-5 and
0% to 5% of compounds of the formula II-3 and II-6.

The liquid-crystal media in this embodiment very particularly preferably comprise in each case in total
31% to 36% of compounds of the formula I-1,
17% to 23% of compounds of the formula I-2,
5% to 15% of compounds of the formula I-3,
0% to 3% of compounds of the formula I-4,
0% to 3% of compounds of the formula I-5,
30% to 37% of compounds of the formula II-1 and II-4,
0% to 2% of compounds of the formula II-2 and II-5 and
0% to 36% of compounds of the formula II-3 and II-6.

In a particularly preferred embodiment, which may be identical and preferably is identical with the preferred embodiments described above for the preferred concentration ranges, the liquid-crystal media comprise:

one or more compounds of the formula I, preferably selected from the group of the compounds of the formulae I-1 to I-5, preferably of the formulae I-1 and/or I-2 and/or I-3, preferably where $R^{11}$ denotes n-alkyl or alkenyl, preferably alkenyl, particularly preferably vinyl, and $R^{12}$ alkyl or alkoxy, preferably alkoxy, preferably one or more compounds of the formula I-1 in which $R^{11}$ preferably denotes n-propyl or n-pentyl and $R^{22}$ preferably denotes ethoxy and/or one or more compounds of the formula I-2 in which $R^{11}$ preferably denotes ethyl or n-butyl, preferably n-butyl, and $R^{22}$ preferably denotes ethoxy and/or one or more compounds of the formula II, preferably selected from the group of the compounds of the formulae II-1 to II-6, preferably of the formulae II-1 and/or II-3 and/or I-5 and/or II-6, preferably where $R^{21}$ denotes n-alkyl or alkenyl, preferably alkenyl, particularly preferably vinyl, and $R^{22}$ denotes alkyl or alkoxy, preferably alkoxy, particularly preferably methyl or propyl, preferably one or more compounds of the formula II-1 in which $R^{21}$ preferably denotes alkenyl, particularly preferably vinyl or 1-propenyl, very particularly preferably vinyl, and $R^{22}$ preferably denotes alkyl, preferably n-alkyl and very particularly preferably propyl and/or one or more compounds of the formula II-1 in which $R^{21}$ and $R^{22}$ preferably denote alkenyl, particularly preferably vinyl or 1-propenyl, very particularly preferably $R^{21}$ denotes vinyl and especially preferably $R^{21}$ and $R^{22}$ both denote vinyl and/or one or more compounds of the formula II-3 in which $R^{21}$ preferably denotes alkenyl, preferably vinyl, and $R^{22}$ preferably denotes alkyl, preferably methyl, and/or one or more compounds of the formula II-5 and/or
one or more compounds of the formula II-6 and/or
one or more compounds selected from the group of the compounds of the formula III and/or
one or more compounds selected from the group of the compounds of the formula IV.

Particular preference is given here to liquid-crystal media which comprise
- one or more compounds of the formula I, preferably selected from the group of the compounds of the formulae I-1 to I-5, preferably where $R^{11}$ denotes n-alkyl and $R^{12}$ denotes alkoxy, and in particular in each case per compound in concentrations of 6% or more to 20% or less per compound and/or
- one or more compounds of the formula II-1, in particular in each case per compound in concentrations of 2% or more, preferably 4% or more, to 11% or less per compound, and/or
- one or more compounds of the formulae II-3, II-2 and II-4, in particular in each case per compound in concentrations of 2% or more, preferably 4% or more, to 11% or less per compound, and/or
- one or more compounds of the formulae III to V, in particular in each case per compound in concentrations of 0.1% or more, preferably 0.4% or more, to 8% or less per compound.

The liquid-crystal media according to the invention preferably have a nematic phase of in each case at least from −20° C. or less to 70° C. or more, particularly preferably from −30° C. or less to 80° C. or more, very particularly preferably from −40° C. or less to 85° C. or more and most preferably from −40° C. or less to 90° C. or more.

The term "have a nematic phase" here means firstly that no smectic phase and no crystallisation are observed at low temperatures at the corresponding temperature and secondly that clearing still does not occur on heating from the nematic phase. The investigation at low temperatures is carried out in a flow viscometer at the corresponding temperature and testing is carried out by storage in test cells having a layer thickness corresponding to the electro-optical application, for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

Furthermore, the liquid-crystal media according to the invention are characterised by optical anisotropy values in the moderate to low range. The birefringence values are preferably in the range from 0.065 or more to 0.130, particularly preferably in the range from 0.070 to 0.100 and very particularly preferably in the range from 0.075 to 0.090.

In an overlapping particularly preferred embodiment of the present invention, birefringence values are preferably in the range from 0.060 or more to 0.120, particularly preferably in the range from 0.070 to 0.090 and very particularly preferably in the range from 0.075 to 0.085.

The liquid-crystal media according to the invention have negative dielectric anisotropy and have relatively high values of the dielectric anisotropy ($|\Delta\epsilon|$), which are preferably in the range from 2.7 or more to 5.3 or less, preferably up to 4.5 or less, preferably from 2.9 or more to 4.5 or less, particularly preferably from 3.0 or more to 4.0 or less and very particularly preferably from 3.5 or more to 3.9 or less.

The liquid-crystal media according to the invention have relatively small values for the threshold voltage ($V_0$) in the range from 1.7 V or more to 2.5 V or less, preferably from 1.8 V or more to 2.4 V or less, particularly preferably from 1.9 V or more to 2.3 V or less and very particularly preferably from 1.95 V or more to 2.1 V or less.

The liquid-crystal media according to the invention preferably have relatively low values of the average dielectric anisotropy ($E_{av.} \equiv (\epsilon_{\parallel} + 2\epsilon_{\perp})/3$), which are preferably in the range from 5.0 or more to 7.0 or less, preferably from 5.5 or more to 6.5 or less, still more preferably from 5.7 or more to 6.4 or less, particularly preferably from 5.8 or more to 6.2 or less and very particularly preferably from 5.9 or more to 6.1 or less.

In addition, the liquid-crystal media according to the invention have high values for the voltage holding ratio in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, greater than or equal to 90%, preferably greater than or equal to 93%, particularly preferably greater than or equal to 96% and very particularly preferably greater than or equal to 98%.

In general, liquid-crystal media having a low addressing voltage or threshold voltage have a lower voltage holding ratio than those having a relatively large addressing voltage or threshold voltage, and vice versa.

These preferred values for the individual physical properties are preferably also maintained in each case combined with one another by the media according to the invention.

For the present invention, "≤" means less than or equal to, preferably less than, and "≥" means greater than or equal to, preferably greater than.

For the present invention,

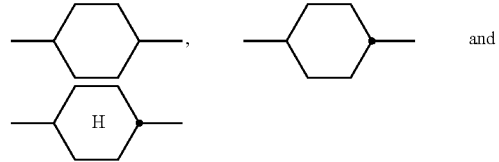

denote trans-1,4-cyclohexylene.

For the present invention, the term "dielectrically positive compounds" denotes compounds having a $\Delta\epsilon$ of >1.5, the term "dielectrically neutral compounds" denotes those where $-1.5 \leq \Delta\epsilon \leq 1.5$, and the term "dielectrically negative compounds" denotes those where $\Delta\epsilon$ is <−1.5. The dielectric anisotropy of the compounds is determined here by dissolving 10% of the compounds in a liquid-crystalline host and determining the capacitance of the resultant mixture at 1 kHz in at least one test cell having a thickness of 20 µm with a homeotropic surface alignment and in at least one test cell having a thickness of 20 µm with a homogeneous surface alignment. The measurement voltage is typically from 0.5 V to 1.0 V, but it is always lower than the capacitive threshold of the respective liquid-crystal mixture investigated.

The host mixture used for dielectrically positive and dielectrically neutral compounds is ZLI-4792 and the host mixture used for dielectrically negative compounds is ZLI-2857, both from Merck KGaA, Germany. The change in the dielectric constants of the host mixture after addition of the compound to be investigated and extrapolation to 100% of the compound employed gives the values for the respective compounds to be investigated. The compound to be investigated is dissolved in the host mixture in an amount of 10%. If the solubility of the substance is too low to do this, the concentration is halved in steps until the investigation can be carried out at the desired temperature.

All temperature values indicated for the present invention are indicated in ° C. and all temperature differences correspondingly in differential degrees, unless explicitly stated otherwise.

For the present invention, the term "threshold voltage" relates to the capacitive threshold ($V_0$), also known as the Freedericksz threshold, unless explicitly stated otherwise. In the examples, as generally customary, the optical threshold for 10% relative contrast ($V_{10}$) is also determined and indicated.

The electro-optical properties, for example the threshold voltage ($V_0$) (capacitive measurement) and the optical threshold ($V_{10}$), are, like the switching behaviour, determined in test cells produced at Merck KGaA. The measurement cells have substrates comprising soda-lime glass and are constructed in an ECB or VA configuration with polyimide alignment layers (SE-1211 with **26 diluent (mixing ratio 1:1), both from Nissan Chemicals, Japan), which are rubbed perpendicular to one another. The area of the transparent, virtually square electrodes comprising ITO is 1 cm². The layer thickness of the test cells used is selected corresponding to the birefringence of the liquid-crystal mixture investigated in such a way that the optical retardation is (0.33±0.01) μm. The polarisers, one of which is located in front of the cell and one of which is located behind the cell, form, with their absorption axes, an angle of 90° to one another and are with these axes parallel to the rubbing direction on their respective adjacent substrate. The layer thickness is usually about 4.0 μm. The cells are filled by means of capillarity under atmospheric pressure and are investigated in the unsealed state. The liquid-crystal mixtures used are, unless stated otherwise, not mixed with a chiral dopant, but they are also particularly suitable for applications in which such doping is necessary.

The electro-optical properties and the response times of the test cells are determined in a DMS 301 measuring instrument from Autronic-Melchers, Karlsruhe, Germany, at a temperature of 20° C. The addressing wave form used is a rectangular wave having a frequency of 60 Hz. The voltage is quoted as $V_{rms}$ (root mean square). During measurement of the response times, the voltage is increased from 0 V to twice the value of the optical threshold ($2V_{10}$) and back. The response times indicated apply to the total time which passes from the change in the voltage until 90% of the respective total change in the light intensity has been reached, i.e. $\tau_{on} \equiv t(0\% \to 90\%)$ and $\tau_{off} \equiv t(100\% \to 10\%)$, i.e. also encompass the respective delay times. Since the individual response times are dependent on the addressing voltage, the sum of the two individual response times ($\Sigma = \tau_{on} + \tau_{off}$) or the average response time ($\tau_{av.} = (\tau_{on} + \tau_{off})/2$) are also indicated in order to improve comparability of the results.

The voltage holding ratio is determined in test cells produced at Merck KGaA. The measurement cells have substrates comprising soda-lime glass and are constructed with polyimide alignment layers (AL-3046 from Japan Synthetic Rubber, Japan) having a layer thickness of 50 nm, which are rubbed perpendicular to one another. The layer thickness is a uniform 6.0 μm. The area of the transparent electrodes comprising ITO is 1 cm².

For the purposes of the present invention, all concentrations are, unless explicitly stated otherwise, indicated in percent by weight and relate to the corresponding mixture or mixture component. All physical properties are and have been determined in accordance with "Merck Liquid Crystals, Physical Properties of Liquid Crystals", Status Nov. 1997, Merck KGaA, Germany, and apply to a temperature of 20° C., unless explicitly stated otherwise. Δn is determined at 589 nm and Δ∈ at 1 kHz.

The rotational viscosity is determined by the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm²·s⁻¹, 14 mm²·s⁻¹ and 27 mm²·s⁻¹ respectively.

The voltage holding ratio is determined at 20° C. and after 5 minutes in the oven at 100° C. The voltage used has a frequency of 60 Hz.

The liquid-crystal media according to the invention may also, if required, comprise further additives, such as, for example, stabilisers, pleochroic dyes and chiral dopants (as component C), in the conventional amounts. The amount of these additives employed is in total 0% or more to 10% or less, based on the amount of the mixture as a whole, preferably 0.1% or more to 6% or less. The concentration of the individual compounds employed is preferably 0.1% or more to 3% or less. The concentration of these and similar additives is not taken into account in the quoting of the concentrations and concentration ranges of the liquid-crystal compounds in the liquid-crystal media.

The compositions consist of a plurality of compounds, preferably 3 or more to 30 or less, particularly preferably 6 or more to 20 or less and very particularly preferably 10 or more to 16 or less, compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, the completeness of the dissolution process is particularly easy to observe. However, it is also possible to prepare the liquid-crystal mixtures in other conventional ways, for example using premixes or from a so-called "multibottle system".

The following examples serve to illustrate the invention without restricting it. In the examples, the melting point T (C,N), the transition from the smectic (S) to the nematic (N) phase T(S,N) and the clearing point T(N,I) of a liquid-crystal substance are indicated in degrees Celsius.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$, are straight-chain alkyl radicals or alkylene radicals, each having n, m and l C atoms respectively. The ring elements of the nuclei of the compound are coded in Table A, the bridging units are listed in Table B, and the meanings of the symbols for the left-hand or right-hand end groups of the molecules are listed in Table C. Illustrative molecular structures and their abbreviations are listed in Table D.

TABLE A

Ring elements

C 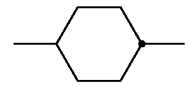

TABLE A-continued

Ring elements

| | |
|---|---|
| D | 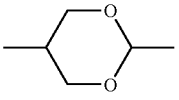 |
| Dl | 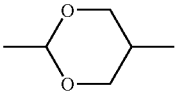 |
| A | 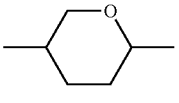 |
| Al | 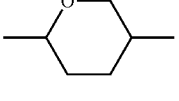 |
| P | 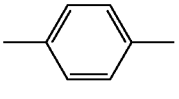 |
| G | 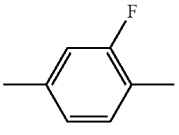 |
| Gl | 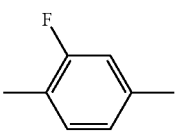 |
| U | 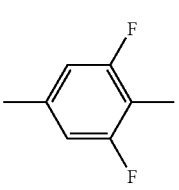 |
| Ul | 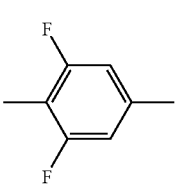 |
| Y | 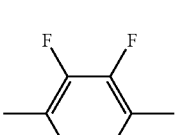 |
| Np | 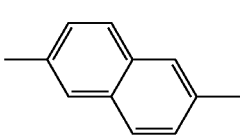 |
| tH | (decahydronaphthalene, trans) |
| dH | (decahydronaphthalene) |

TABLE B

| | Bridging units |
|---|---|
| E | —$CH_2CH_2$— |
| V | —CH=CH— |
| X | —CF=CH— |
| XI | —CH=CF— |
| B | —CF=CF— |
| T | —C≡C— |
| W | —$CF_2CF_2$— |
| Z | —CO—O— |
| ZI | —O—CO— |
| O | —$CH_2$—O— |
| OI | —O—$CH_2$— |
| Q | —$CF_2$—O— |
| QI | —O—$CF_2$— |
| T | —C≡C— |

TABLE C

End groups

| On the left standing alone | | On the right standing alone | |
|---|---|---|---|
| -n- | $C_nH_{2n+1}$— | -n | —$C_nH_{2n+1}$ |
| -nO- | $C_nH_{2n+1}$O— | -nO | —O $C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2$O— | -OM | —$OCFH_2$ |
| -DO- | $CF_2HO$— | -OD | —$OCF_2H$ |
| -TO- | $CF_3$O— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | NC—C≡C— | -AN | —C≡C—CN |
| On the left in combination | | On the right in combination | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are placeholders for other abbreviations from this table.

TABLE D $C_nH_{2n+1}$—⬡—⬡—$C_mH_{2m+1}$
CC-n-m $C_nH_{2n+1}$—⬡—⬡—O—$C_mH_{2m+1}$
CC-n-Om $C_nH_{2n+1}$—⬡—⬡—CH=$CH_2$
CC-n-V $C_nH_{2n+1}$—⬡—⬡—CH=CH—$C_mH_{2m+1}$
CC-n-Vm $C_nH_{2n+1}$—⬡—⬡—$(CH_2)_m$—CH=$CH_2$
CC-n-mV $C_nH_{2n+1}$—⬡—⬡—$(CH_2)_m$—CH=CH—$C_lH_{2l+1}$
CC-n-mVl $H_2C$=CH—⬡—⬡—CH=$CH_2$
CC-V-V $CH_2$=CH—⬡—⬡—$(CH_2)_m$—CH=$CH_2$
CC-V-mV $CH_2$=CH—⬡—⬡—CH=CH—$C_mH_{2m+1}$
CC-V-Vm $CH_2$=CH—$(CH_2)_n$—⬡—⬡—$(CH_2)_m$—CH=$CH_2$
CC-Vn-mV $C_nH_{2n+1}$—CH=CH—⬡—⬡—$(CH_2)_m$—CH=$CH_2$
CC-nV-mV $C_nH_{2n+1}$—CH=CH—⬡—⬡—CH=CH—$C_mH_{2m+1}$
CC-nV-Vm $C_nH_{2n+1}$—⬡—⬢—$C_mH_{2m+1}$
CP-n-m

TABLE D-continued
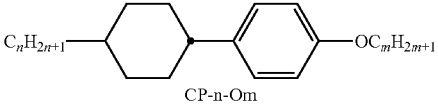
CP-nO-m
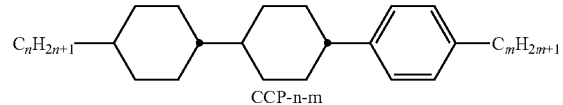
CP-n-Om
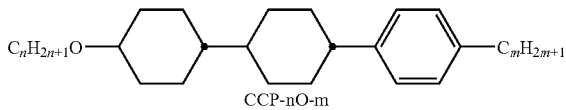
CCP-n-m
CCP-nO-m
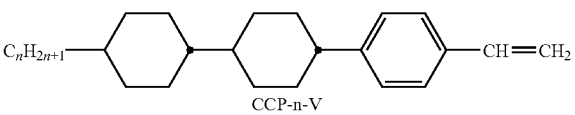
CCP-n-Om
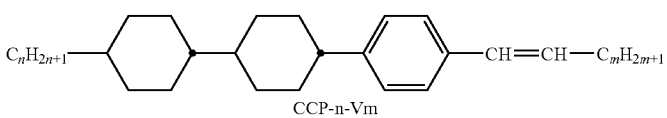
CCP-n-V
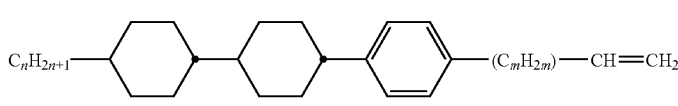
CCP-n-Vm
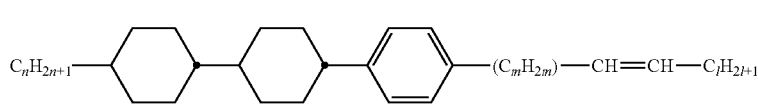
CCP-n-mV
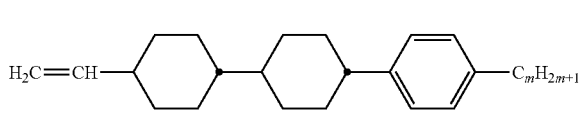
CCP-n-mVl
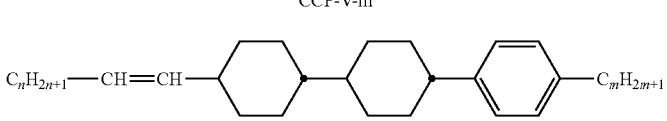
CCP-V-m
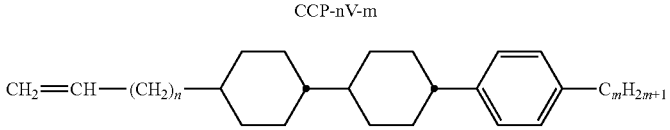
CCP-nV-m
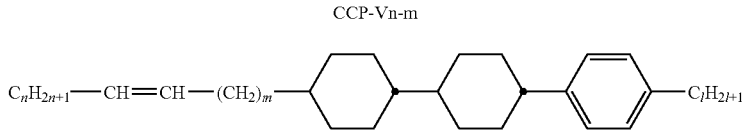
CCP-Vn-m
CCP-nVm-l TABLE D-continued
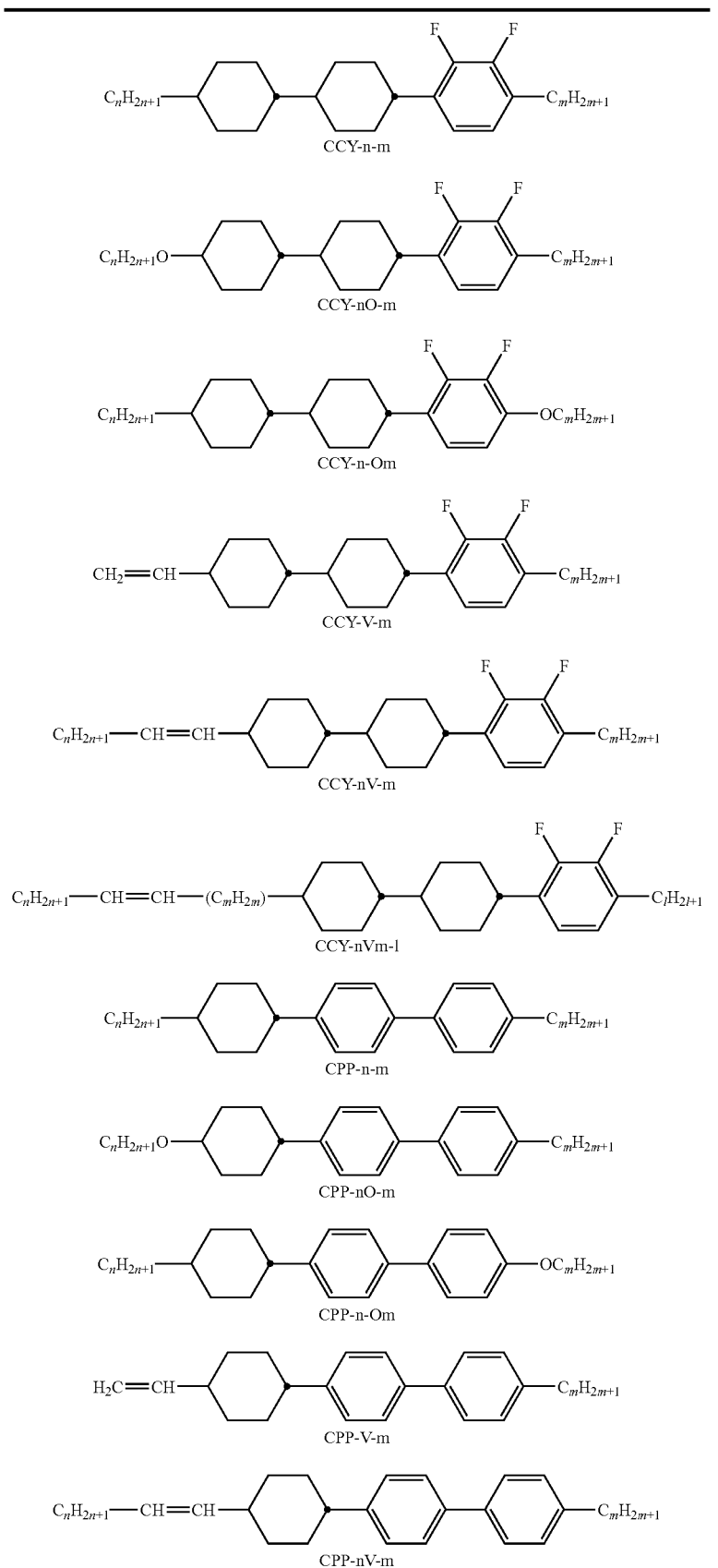

TABLE D-continued
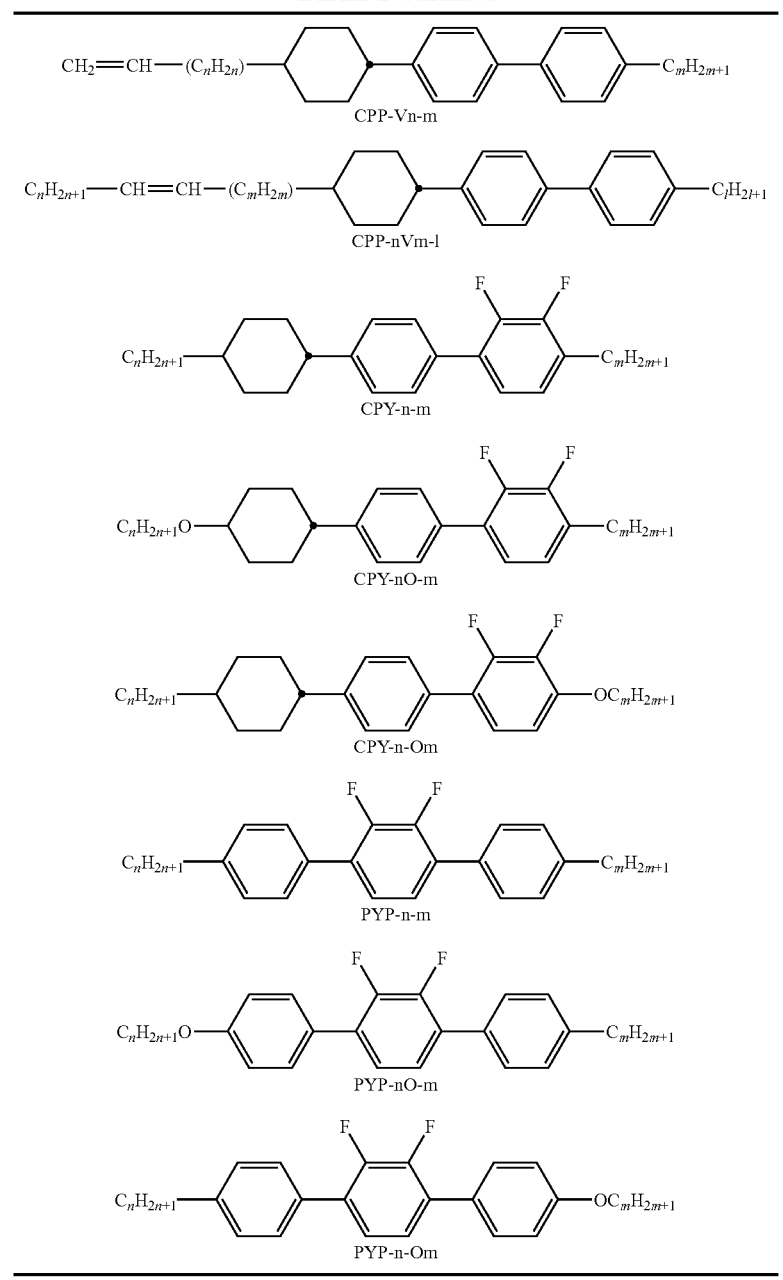
| TABLE E | TABLE E-continued |
|---|---|
| Stabilisers which can be added, for example, to the mixtures according to the invention are indicated below. | Stabilisers which can be added, for example, to the mixtures according to the invention are indicated below. |
| 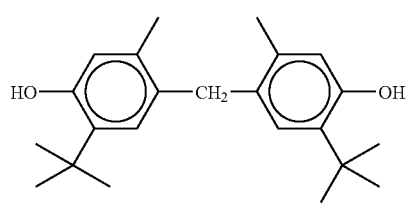 | 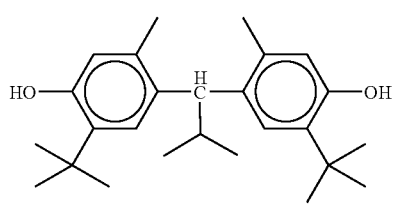 |

TABLE E-continued
Stabilisers which can be added, for example, to the mixtures according to the invention are indicated below.
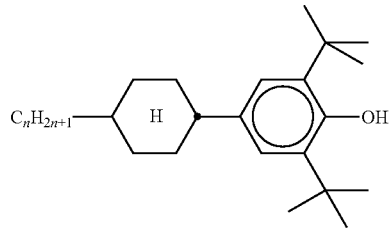
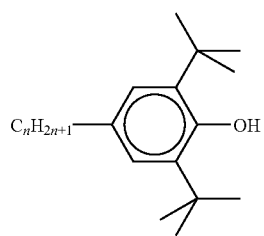
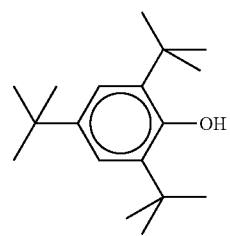
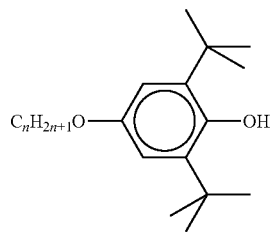
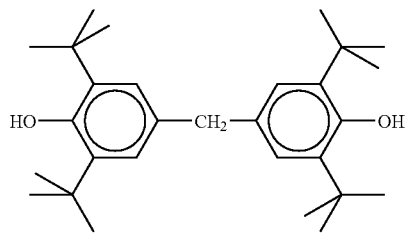
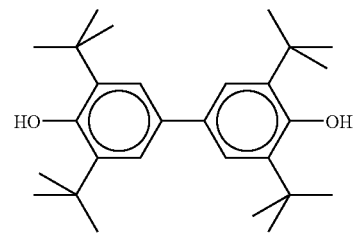
TABLE E-continued
Stabilisers which can be added, for example, to the mixtures according to the invention are indicated below.
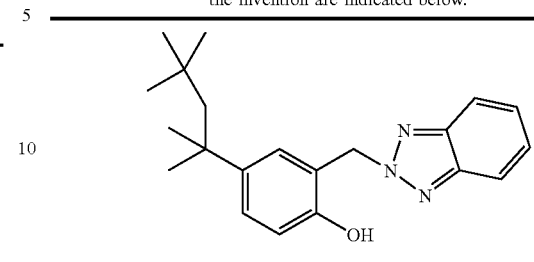
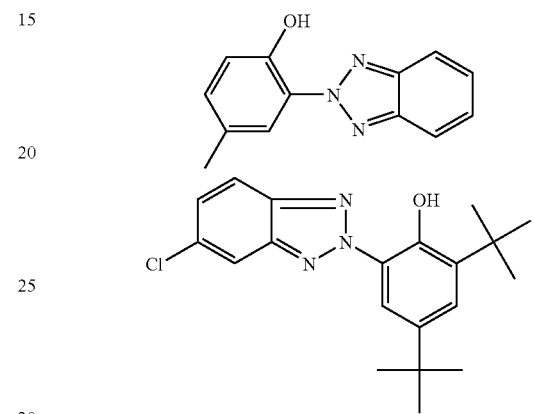
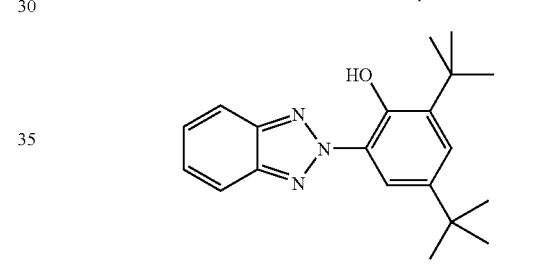
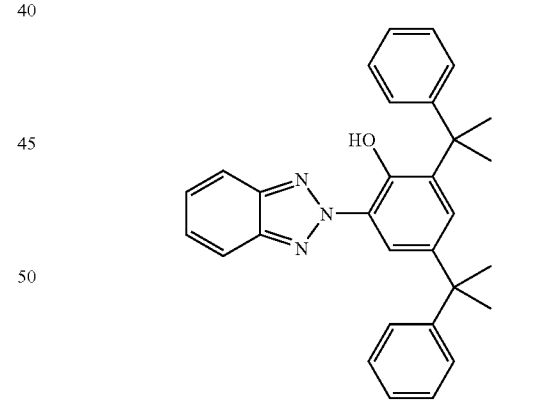
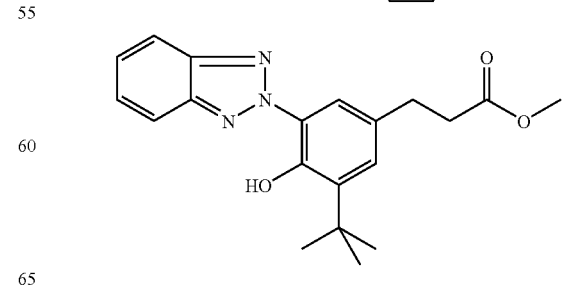

In a preferred embodiment of the present invention, the media according to the invention comprise one or more compounds selected from the group of the compounds of Table E.
TABLE F
Table F indicates chiral dopants which are preferably employed in the mixtures according to the invention.
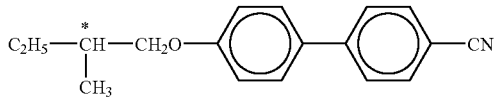
C 15
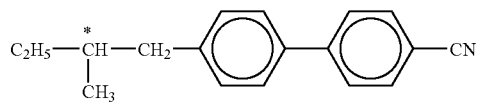
CB 15
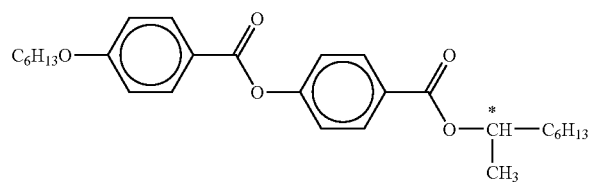
R/S-811
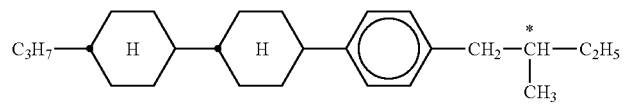
CM 44
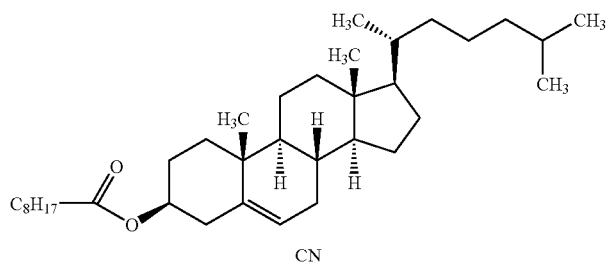
CN
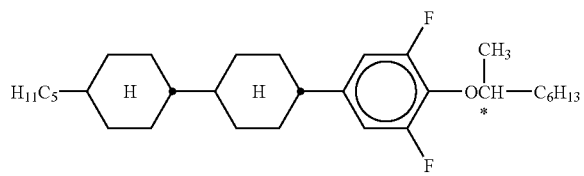
R/S-2011
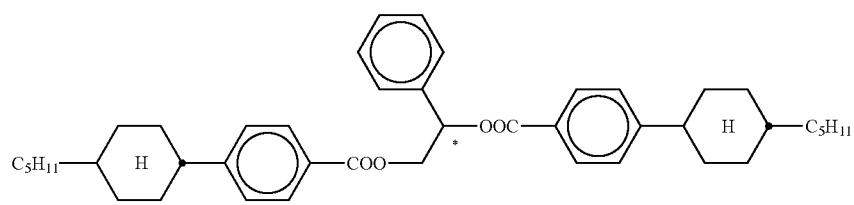
R/S-1011

TABLE F-continued

Table F indicates chiral dopants which are preferably employed in the mixtures according to the invention.

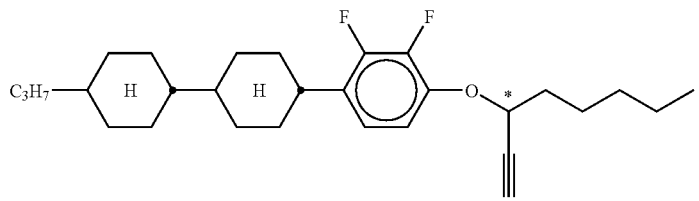

R/S-3011

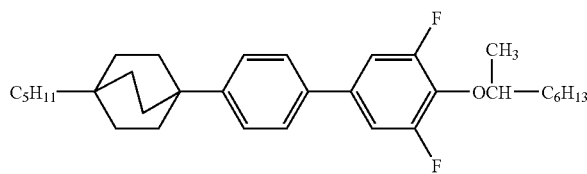

R/S-4011

EXAMPLES

The following examples are intended to explain the invention without limiting it. However, they illustrate the range of properties which can preferably be achieved, as well as the compounds preferably to be employed.

The liquid-crystal media are investigated with respect to their applicational properties. In particular, their respective electro-optical characteristic lines, response times and their voltage holding ratio in test cells are determined.

The indicated values for the above-mentioned properties are generally average values of the measurements of two test cells in each case. The deviations between the results of the individual cells were generally a maximum of 4 to 5%.

Example 1

Three liquid-crystal mixtures are achieved, all of which have virtually the same values of the clearing point, the birefringence, the dielectric anisotropy and even the rotational viscosity, but differ significantly in the value of the calculated peak times or the predicted response times ($t_{max}$ or $t_{max}/\Delta n^2$) respectively. The mixture M-2 is a mixture which consists of equal parts of M1 and M-3. The compositions of the mixtures are shown in the following table, the investigation results in the table after next.

TABLE 1a

| | Example No. | | |
|---|---|---|---|
| | 1-1 | 1-2 | 1-3 |
| | | Mixture No. | |
| | M-1 | M-2 | M-3 |
| | | Composition | |
| Compound | | Concentration/% | |
| CY-3-O4 | 18.0 | 15.0 | 12.0 |
| CY-5-O2 | | 6.0 | 12.0 |
| CY-5-O4 | 13.0 | 12.5 | 12.0 |
| CCY-3-O2 | 8.0 | 9.5 | 11.0 |
| CCY-4-O2 | 8.0 | 4.0 | |
| CCY-5-O2 | | 5.0 | 10.0 |
| CCY-2-1 | 8.0 | 4.0 | |
| CCY-3-1 | 8.0 | 4.0 | |

TABLE 1a-continued

| | Example No. | | |
|---|---|---|---|
| | 1-1 | 1-2 | 1-3 |
| | | Mixture No. | |
| | M-1 | M-2 | M-3 |
| | | Composition | |
| Compound | | Concentration/% | |
| CPY-2-O2 | | 4.0 | 8.0 |
| PYP-2-3 | 5.0 | 2.5 | |
| CC-3-V | | 8.0 | 16.0 |
| CC-3-V1 | 8.0 | 8.5 | 9.0 |
| CC-4-V | 10.0 | 5.0 | |
| CC-3-4 | 8.0 | 4.0 | |
| CC-3-5 | 6.0 | 7.0 | 8.0 |
| CCP-V-1 | | 1.0 | 2.0 |
| Σ | 100.0 | 100.0 | 100.0 |

TABLE 1b

| | Example No. | | |
|---|---|---|---|
| | 1-1 | 1-2 | 1-3 |
| | | Mixture No. | |
| | M-1 | M-2 | M-3 |
| | | Physical properties | |
| T(N.I)/° C. | 70.4 | 70.0 | 70.0 |
| $n_e$ [589 nm, 20° C.] | 1.5586 | 1.5588 | 1.5564 |
| $n_o$ [589 nm, 20° C.] | 1.4764 | 1.4767 | 1.4738 |
| Δn [589 nm, 20° C.] | 0.0822 | 0.0821 | 0.0826 |
| $\epsilon_\parallel$ [1 kHz, 20° C.] | 3.4 | 3.5 | 3.6 |
| $\epsilon_\perp$ [1 kHz, 20° C.] | 6.6 | 6.9 | 7.4 |
| Δε [1 kHz, 20° C.] | −3.2 | −3.4 | −3.8 |
| $\epsilon_{av.}$ [1 kHz, 20° C.] | 5.53 | 5.83 | 6.13 |
| ν [20° C.]/mm² s⁻¹ | 20 | 18.5 | 17 |
| ν [0° C.]/mm² s⁻¹ | n.d. | n.d. | 55 |
| $\gamma_1$ [20° C.] mPa · s | 113 | 113 | 113 |
| $k_1$ [20° C.]/pN | 12.7 | 13.2 | 12.6 |
| $k_3$ [20° C.]/pN | 12.9 | 13.7 | 14.6 |
| $k_3/k_1$ [20° C.] | 1.02 | 1.04 | 1.16 |
| $V_0$ [20° C.]/V | 2.14 | 2.11 | 2.08 |
| $V_{10}$ [20° C.]/V | 2.54 | 2.57 | 2.48 |

TABLE 1b-continued

| | Example No. | | |
|---|---|---|---|
| | 1-1 | 1-2 | 1-3 |
| | Mixture No. | | |
| | M-1 | M-2 | M-3 |
| Calculated times | | | |
| $t_{max}$/ms | 0.161 | 0.143 | 0.120 |
| $t_{max}/\Delta n^2$/ms | 23.9 | 21.1 | 17.7 |
| Experimental response times: $\tau(0\ V => 2 \times V_{10})$ | | | |
| $\tau_{on}$ [$2 \times V_{10}$, 20° C.]/ms | 10.1 | 8.3 | 7.0 |
| $\tau_{off}$ [$2 \times V_{10}$, 20° C.]/ms | 10.6 | 10.0 | 10.8 |
| $\Sigma$ [$2 \times V_{10}$, 20° C.]/ms | 20.7 | 18.3 | 17.8 |

Note:
n.d. not determined.

As can be seen from the results, the response time of the liquid-crystal displays decreases significantly from Example 1-1 via Example 1-2 to Example 1-3 in parallel with the predicted response time $t_{max}$ or $t_{max}/\Delta n^2$ in accordance with the teaching of the present invention.

Example 2

Three liquid-crystal mixtures are achieved, all of which have virtually the same values of the clearing point, the birefringence, the dielectric anisotropy, the rotational viscosity and even in the value of the calculated peak times or response times ($t_{max}$ or $t_{max}/\Delta n^2$), but differ significantly in their composition. The mixture M-5 is a mixture which consists of equal parts of M-4 and M-6. The compositions of the mixtures are shown in the following table, the investigation results in the table after next.

TABLE 2a

| | Example No. | | |
|---|---|---|---|
| | 2-1 | 2-2 | 2-3 |
| | Mixture No. | | |
| | M-4 | M-5 | M-6 |
| | Composition | | |
| Compound | Concentration/% | | |
| CY-3-O2 | 16.0 | 8.0 | |
| CY-3-O4 | | 9.0 | 18.0 |
| CY-5-O2 | 14.0 | 7.0 | |
| CY-5-O4 | | 8.5 | 17.0 |
| CCY-3-O2 | 12.0 | 11.0 | 10.0 |
| CCY-5-O2 | 11.0 | 10.5 | 10.0 |
| CCY-2-1 | 9.0 | 4.5 | |
| CCY-3-1 | 8.0 | 4.0 | |
| CPY-2-O2 | | 5.0 | 10.0 |
| CPY-3-O2 | | 1.0 | 2.0 |
| CC-3-4 | 8.0 | 4.0 | |
| CC-3-5 | 9.0 | 10.5 | 12.0 |
| CC-5-O1 | | 3.0 | 6.0 |
| CC-5-V | | 7.5 | 15.0 |
| CP-5-3 | 7.0 | 3.5 | |
| CP-3-O1 | 6.0 | 3.0 | |
| $\Sigma$ | 100.0 | 100.0 | 100.0 |

TABLE 2b

| | Example No. | | |
|---|---|---|---|
| | 2-1 | 2-2 | 2-3 |
| | Mixture No. | | |
| | M-4 | M-5 | M-6 |
| Physical properties | | | |
| T(N.I)/° C. | 71.0 | 70.0 | 70.0 |
| $n_e$ [589 nm, 20° C.] | 1.5587 | 1.5584 | 1.5567 |
| $n_o$ [589 nm, 20° C.] | 1.4765 | 1.4759 | 1.4746 |
| $\Delta n$ [589 nm, 20° C.] | 0.0822 | 0.0825 | 0.0821 |
| $\epsilon_\parallel$ [1 kHz, 20° C.] | 3.6 | 3.7 | 3.7 |
| $\epsilon_\perp$ [1 kHz, 20° C.] | 7.4 | 7.5 | 7.6 |
| $\Delta\epsilon$ [1 kHz, 20° C.] | −3.8 | −3.9 | −3.9 |
| $\epsilon_{av.}$ [1 kHz, 20° C.] | 6.13 | 6.23 | 6.3 |
| $\nu$ [20° C.]/mm² s⁻¹ | 21 | 21.5 | 22 |
| $\nu$ [0° C.]/mm² s⁻¹ | 67 | n.d. | n.d. |
| $\nu$ [−20° C.]/mm² s⁻¹ | 416 | n.d. | n.d. |
| $\nu$ [−30° C.]/mm² s⁻¹ | 1.380 | n.d. | n.d. |
| $\gamma_1$ [20° C.] mPa · s | 133 | 130 | 127 |
| $k_1$ [20° C.]/pN | 13.0 | 13.3 | 13.4 |
| $k_3$ [20° C.]/pN | 15.1 | 14.0 | 13.1 |
| $k_3/k_1$ [20° C.] | 1.15 | 1.05 | 0.98 |
| $V_0$ [20° C.]/V | 2.10 | 2.01 | 1.92 |
| $V_{10}$ [20° C.]/V | 2.53 | 2.44 | 2.40 |
| Calculated times | | | |
| $t_{max}$/ms | 0.147 | 0.145 | 0.147 |
| $t_{max}/\Delta n^2$/ms | 21.8 | 21.3 | 21.8 |
| Experimental response times: $\tau(0\ V => 2 \times V_{10})$ | | | |
| $\tau_{on}$ [$2 \times V_{10}$, 20° C.]/ms | 10.0 | 7.6 | 7.3 |
| $\tau_{off}$ [$2 \times V_{10}$, 20° C.]/ms | 11.7 | 12.0 | 11.4 |
| $\Sigma$ [$2 \times V_{10}$, 20° C.]/ms | 21.7 | 19.6 | 18.7 |

Note:
n.d. not determined.

As can be seen from the results, all three mixtures of this example have good response times in accordance with their low value for $t_{max}$ or $t_{max}/\Delta n^2$, in accordance with the teaching of the present invention.

As can furthermore be seen from the results, the response time of the liquid-crystal displays additionally decreases significantly from Example 2-1 via Example 2-2 to Example 2-3 in parallel to the change in the composition of the mixtures, in accordance with the preferred teaching of the present invention.

The liquid-crystal mixtures of Examples 1 and 2 are particularly distinguished by good response times, this applies in particular to mixtures M-2, M-3, M-5 and M-6. The liquid-crystal mixtures of Examples 1 and 2, particularly the four mixtures just mentioned, can advantageously be used in ECB displays of all known designs, such as, for example: MVA, PVA and ASV, and also in IPS and PA LCD displays.

The invention claimed is:

1. A nematic liquid-crystal medium of negative dielectric anisotropy, having a peak time ($t_{max}$) of 0.25 ms or less, which is determined with the aid of equations (1) and (2), Equation (1)

$$I_{(\theta_0)} = \frac{S(2\alpha_1 \sin^2\theta_b \cos^2\theta_b - \gamma_2 \cos 2\theta_b + \gamma_3)(\varepsilon_0 \Delta\varepsilon \sin 2\theta b)^2 E_b^3}{(\alpha_1\gamma_1 + \gamma_2^2)\sin^2 2\theta_b - \gamma_1^2 - \gamma_2^2 + 2\gamma_1\gamma_3}$$

-continued $$t(\theta_b) = \frac{\beta_2}{2\varepsilon_0\Delta\varepsilon E_b^2\beta_3}\left\{-\ln\left(\frac{\tan\theta_b}{\tan\theta_0}\right)+\right.$$
$$\frac{-\beta_5+\gamma_2\sqrt{\beta_1}}{2\beta_4\sqrt{\beta_1}}\ln\left(\frac{\beta_4\tan^2\theta_b+\beta_7+\sqrt{\beta_1}}{\beta_4\tan^2\theta_0+\beta_7+\sqrt{\beta_1}}\right)+$$
$$\left.\frac{\beta_5+\gamma_2\sqrt{\beta_1}}{2\beta_4\sqrt{\beta_1}}\ln\left(\frac{\beta_4\tan^2\theta_b+\beta_7-\sqrt{\beta_1}}{\beta_4\tan^2\theta_0+\beta_7-\sqrt{\beta_1}}\right)\right\}+$$
$$\frac{\beta_6}{2\varepsilon_0\Delta\varepsilon E_b^2\sqrt{\beta_1}}$$
$$\ln\left[\frac{(\alpha_1\cos2\theta_b+\gamma_2+\sqrt{\beta_1})(\alpha_1\cos2\theta_0+\gamma_2-\sqrt{\beta_1})}{(\alpha_1\cos2\theta_b+\gamma_2-\sqrt{\beta_1})(\alpha_1\cos2\theta_0+\gamma_2+\sqrt{\beta_1})}\right]$$

Equation (2)

where:
S=electrode area
$E_b=U/l$ (U=90 V and l=22 μm are assumed),
$\theta_0$=bulk tilt angle at time t=0
$\theta_b$=bulk tilt angle
$\alpha_1$ to $\alpha_5$=Leslie viscosity coefficients, $\beta_1=\alpha_1^2+\gamma_2^2+2\alpha_1\gamma_3$, $\beta_2=\gamma_1^2+\gamma_2^2-2\gamma_1\gamma_3$, $\beta_3=\gamma_2-\gamma_3$, $\beta_4=\gamma_2+\gamma_3$, $\beta_5=\gamma_2^2+\alpha_1\gamma_3$, $\beta_6=\alpha_1\gamma_1+\gamma_2^2$, $\beta_7=\alpha_1+\gamma_3$ $\gamma_1=-\alpha_2$;(rotational viscosity), $\gamma_2=\alpha_3-\alpha_2$ and $\gamma_3=\alpha_3+\alpha_4+\alpha_5$, wherein for the Leslie viscosity coefficients, the following assumptions apply $\alpha_1=-10$ mPas and $\alpha_3=0$ mPas, in addition, for $\alpha_3=0$ in accordance with Parodi:

$\alpha_4+\alpha_5=-\alpha_2+2\eta_2$ $\eta_2\approx\rho*\nu$ where:
ρ=density (about 1 g/cm³) and
ν=flow viscosity,
wherein
the medium comprises 98% or more of components A and B, and
the medium comprises 60-70% of components A,
component A is a dielectrically negative, liquid-crystalline component, which consists of:

33% to 37%, based on the medium, of at least one compound of formula I-1

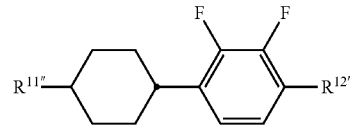

I-1 and 3% to 17%, based on the medium, of at least one compound of formula I-3

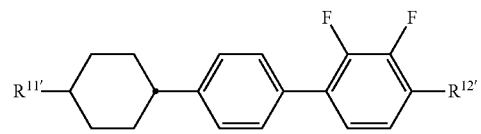

I-3 in which $R^{11''}$ is $C_{3-7}$-alkyl, $R^{11'}$ is $C_{1-7}$-alkyl, $R^{12'}$ is alkyl having 1 to 7 C atoms, alkoxy having 1 to 7 C atoms, alkenyl or alkenyloxy having 2 to 7 C atoms, where in $R^{11''}$ and $R^{12'}$ one or more H atoms in all groups may be replaced by halogen atoms, wherein in at least one compound of formula I-1 $R^{12'}$ is $C_4$-alkoxy, and the remainder of component A is of one or more dielectrically negative compound(s) of formula I, which are not compounds of formula I-1 or I-3,

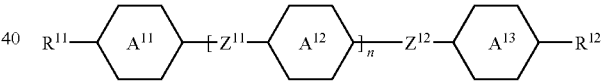

I in which at least one of

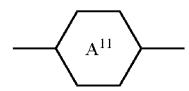

to

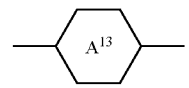

denotes

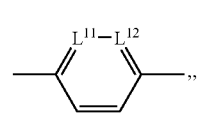

,, and the others, if present, in each case, independently of one another, have the same meaning or denote

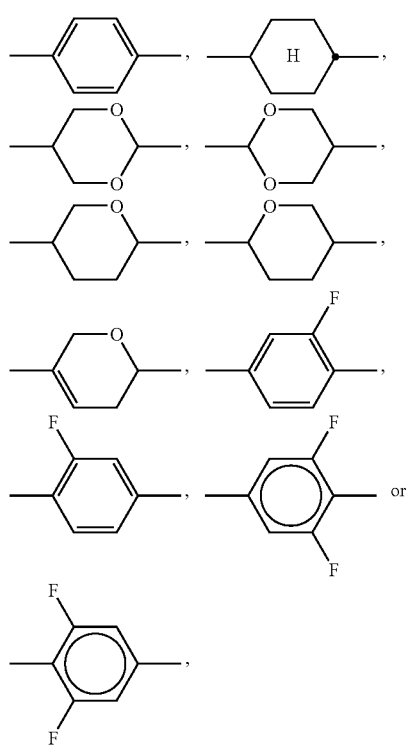

$R^{11}$ and $R^{12}$, independently of one another, denote alkyl having 1 to 7 C atoms,
$L^{11}$ and $L^{12}$, independently of one another, denote C—F or N,
$Z^{11}$ and $Z^{12}$, in each case independently of one another, denote —$CH_2$—$CH_2$—, —C≡C—, —CH=CH—, —CF=CF—, —CF=CH—, —CH=CF—, —$CH_2$—$CF_2$—, —$CF_2$—$CH_2$—, —$CF_2$—$CF_2$—, —CO—O—, —O—CO—, —$OCH_2$—, —$CH_2$O—, —$OCF_2$—, —$CF_2$O— or a single bond, and
n denotes 0, 1 or 2,
and
component B is a dielectrically neutral, liquid-crystalline component, which consists of one or more dielectrically neutral compound(s) of formula II

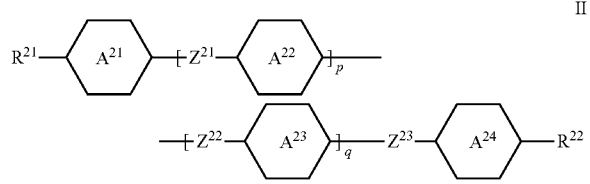
II in which
$R^{21}$ and $R^{22}$, in each case independently of one another, are $C_{1-7}$-alkyl, $C_{1-7}$-alkoxy, or alkoxyalkyl, alkenyl or alkenyloxy having 2-7 cations in which one or more H atoms in all groups may be replaced by halogen atoms,
$Z^{21}$ to $Z^{23}$, in each case independently of one another, are —$CH_2$—$CH_2$—, —C≡C—, —CH=CH—, —COO— or a single bond, and

in each case independently of one another, denote

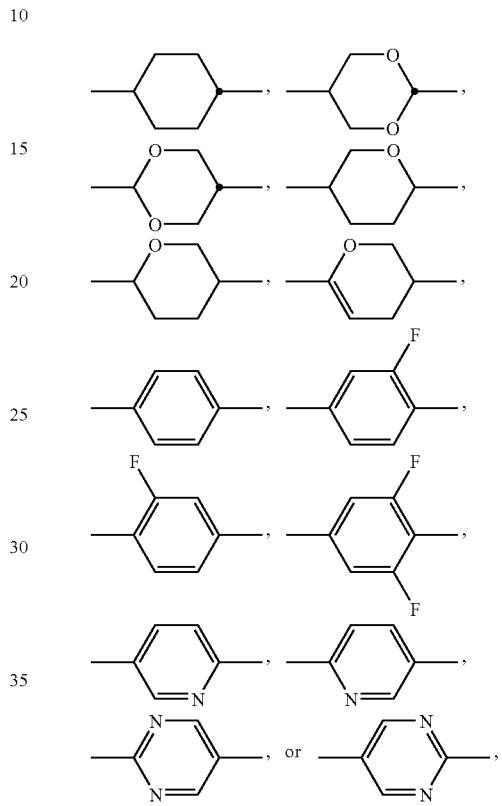

and
p and q, in each case independently of one another, denote 0 or 1.

2. The liquid-crystal medium according to claim 1, having a value of the quotient of peak time and square of birefringence ($t_{max}/\Delta n^2$) of 22 ms or less.

3. The liquid-crystal medium according to claim 1, having an average of the dielectric constants in the range from 5.5 or more to 6.5 or less.

4. The liquid-crystal medium according to claim 1, having a dielectric anisotropy in the range from −3.0 or less to −4.0 or more.

5. The liquid-crystal medium according to claim 1, having a birefringence in the range from 0.070 to 0.110.

6. An electro-optical display containing a liquid-crystal medium according to claim 1.

7. A display according to claim 6, comprising a device for addressing the display having an active matrix.

8. A method for optimizing of the response time of a liquid-crystal display, comprising using in said display a liquid-crystal medium according to claim 1.

9. The display according to claim 7, wherein the device is a matrix of thin-film transistors.

10. The liquid crystalline medium according to claim 1, comprising 30% to 37% of at least one compound of formula II that is of formula II-1 or II-4

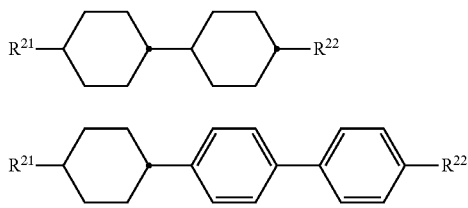

II-1

II-4 in which $R^{21}$ and $R^{22}$, in each case independently of one another, denote alkyl having 1 to 7 C atoms, alkoxy having 1 to 7 C atoms, alkenyl or alkenyloxy having 2 to 7 C atoms, where one or more H atoms in all groups may be replaced by halogen atoms.

11. The liquid crystalline medium according to claim 1, wherein $R^{11'}$ is $C_{1-3}$-alkyl.

12. The liquid crystalline medium according to claim 1, wherein $R^{11'}$ is $C_{2-3}$-alkyl.

13. The liquid crystalline medium according to claim 1, wherein $R^{11'}$ is $C_{3-7}$-alkyl.

14. The liquid crystalline medium according to claim 1, wherein I-3 is

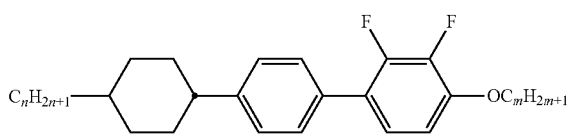

and n and m are 2.

15. The liquid crystalline medium according to claim 1, wherein I-3 is

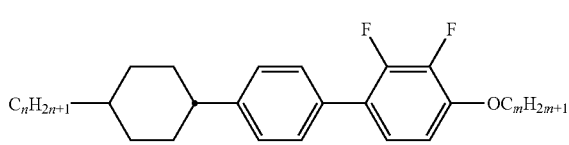

and n is 3 and m is 2.

16. The liquid crystalline medium according to claim 1, wherein the compounds of Formula I are compounds of one or more of Formulae I-2, I-4 or I-5

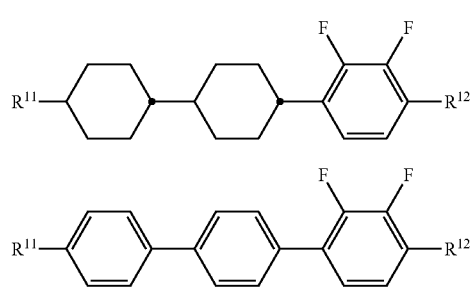

I-2

I-4

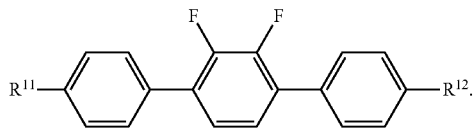

I-5

17. The liquid crystalline according to claim 1, wherein the medium comprises 99% to 100% of components A and B.

18. The liquid crystalline medium according to claim 1, wherein the concentration of the compounds of formula I-3 is 10% or more.

19. The liquid crystalline medium according to claim 1, wherein the concentration of the compounds of formula I-3 is 13% or more.

20. The liquid crystalline medium according to claim 1, wherein the concentration of component A is 65-69%.

21. The liquid crystalline medium according to claim 1, wherein one or more compounds of formula I are of formula I-2

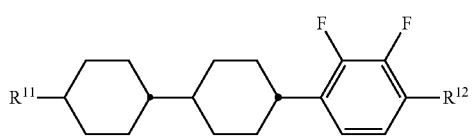

I-2 wherein $R^{11}$ and $R^{12}$, independently of one another, denote alkyl having 1 to 7 C atoms, which compounds of formula I-2 have a concentration of 20-30%, based on the medium.

22. The liquid crystalline medium according to claim 1, wherein $Z^{21}$ and $Z^{23}$ are each independently —CH$_2$—CH$_2$ or a single bond.

23. The liquid crystalline medium according to claim 1, wherein $Z^{21}$ and $Z^{23}$ are single bonds.

24. The liquid crystalline medium according to claim 1, wherein the one or more compounds of Formula II are of one or more of the following formulae

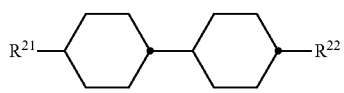

II-1

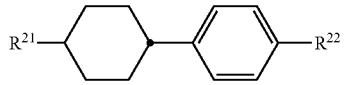

II-2

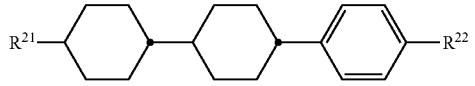

II-3

II-4

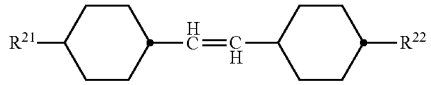

II-5

-continued

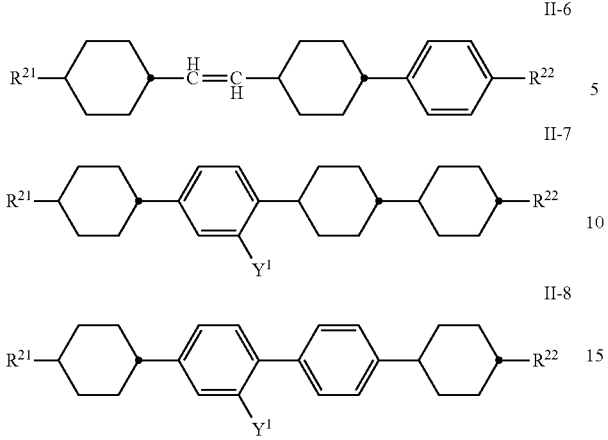

in which Y¹ is H or F, and R²¹ and R²² are defined as for the compounds of formula II.

25. The liquid crystalline medium according to claim 21, wherein the concentration of the compounds of formula I-2 is 21% to 25%.

26. The liquid-crystalline medium according to claim 1, wherein the one or more compounds of Formula II contain or are a compound of the formula CC-3-V:

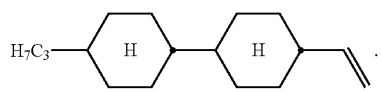

27. The liquid-crystalline medium according to claim 1, wherein component A contains 34% to 37% of at least one compound of formula I-1.

28. The liquid-crystalline medium according to claim 1, wherein component A contains at least two compounds of formula I-1 in which R¹² is C₄-alkoxy.

29. The liquid-crystalline medium according to claim 1, containing three or more compounds of formula I-1.

30. The liquid-crystalline medium according to claim 1, containing four or more compounds of formula I-1.

31. The liquid-crystalline medium according to claim 1, wherein the compounds of formula I-3 contain at least one compound of I-3 in which R¹¹' is C₃₋₅ alkyl.

32. The liquid-crystalline medium according to claim 1, wherein Z²¹ to Z²³ are a single bond.

33. The liquid-crystalline medium according to claim 2, wherein the compounds of Formula I are compounds of one or more of Formulae I-2, I-4 or I-5

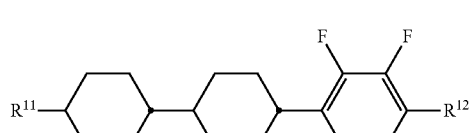

I-2

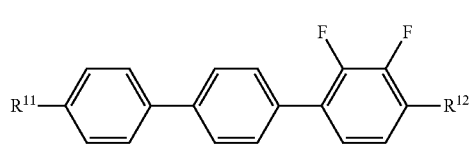

I-4

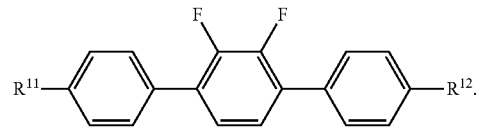

I-5

34. The liquid crystalline medium according to claim 3, wherein the compounds of Formula I are compounds of one or more of Formulae I-2, I-4 or I-5

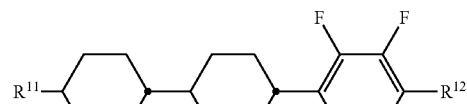

I-2

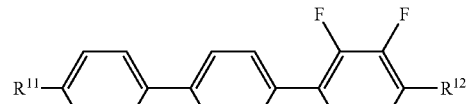

I-4

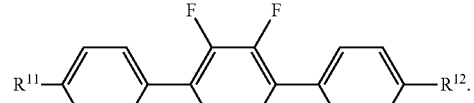

I-5

35. The liquid crystalline medium according to claim 4, wherein the compounds of Formula I are compounds of one or more of Formulae I-2, I-4 or I-5

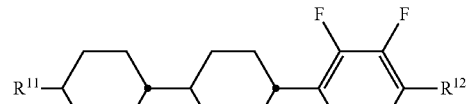

I-2

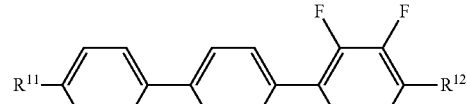

I-4

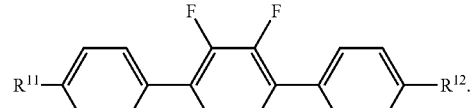

I-5

36. The liquid crystalline medium according to claim 5, wherein the compounds of Formula I are compounds of one or more of Formulae I-2, I-4 or I-5

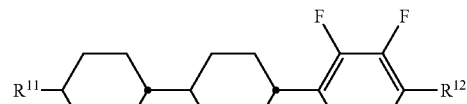

I-2

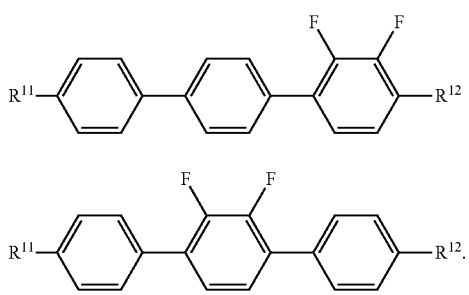

37. The liquid crystalline medium according to claim 10, wherein the compounds of Formula I are compounds of one or more of Formulae I-2, I-4 or I-5

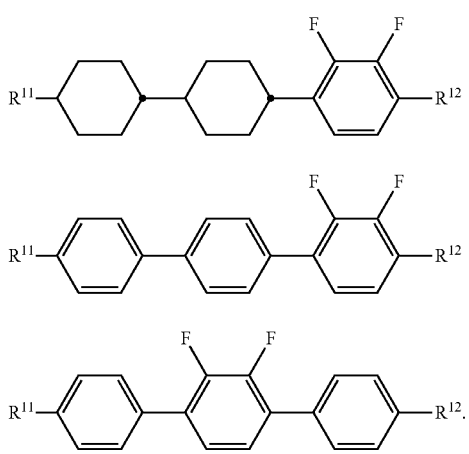

38. The liquid crystalline medium according to claim 11, wherein the compounds of Formula I are compounds of one or more of Formulae I-2, I-4 or I-5

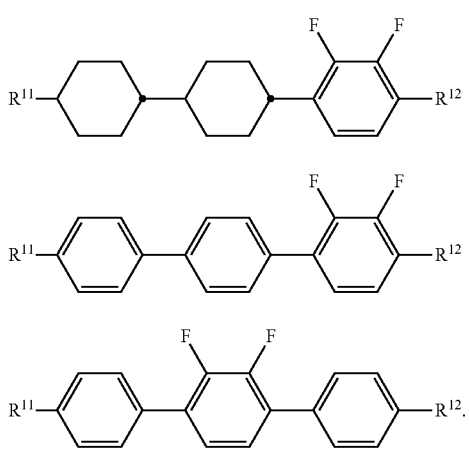

39. The liquid crystalline medium according to claim 12, wherein the compounds of Formula I are compounds of one or more of Formulae I-2, I-4 or I-5

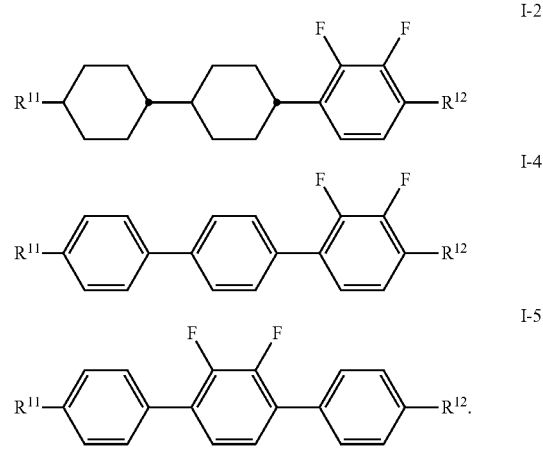

40. The liquid crystalline medium according to claim 13, wherein the compounds of Formula I are compounds of one or more of Formulae I-2, I-4 or I-5

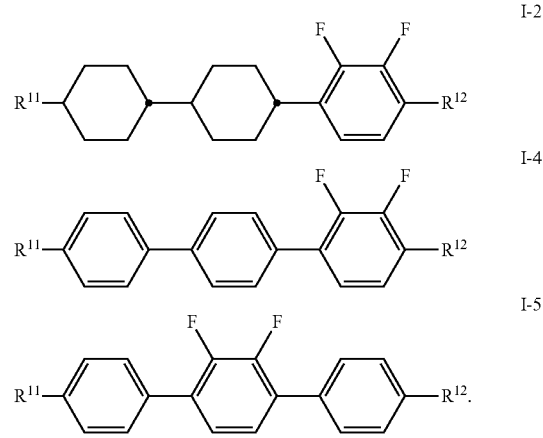

41. The liquid crystalline medium according to claim 14, wherein the compounds of Formula I are compounds of one or more of Formulae I-2, I-4 or I-5

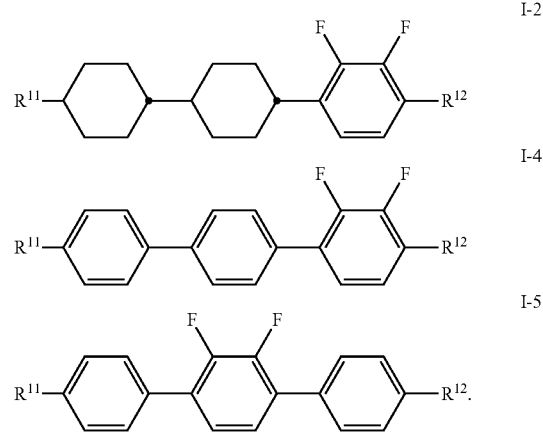

42. The liquid crystalline medium according to claim 15, wherein the compounds of Formula I are compounds of one or more of Formulae I-2, I-4 or I-5

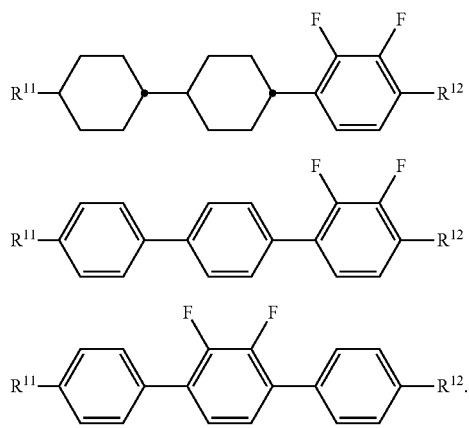

43. The liquid crystalline medium according to claim 2, wherein one or more compounds of formula I are of formula I-2

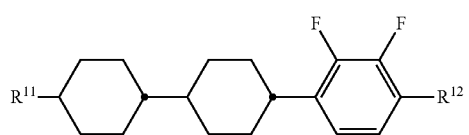

wherein $R^{11}$ and $R^{12}$, independently of one another, denote alkyl having 1 to 7 C atoms,
which compounds of formula I-2 have a concentration of 20-30%, based on the medium.

44. The liquid crystalline medium according to claim 3, wherein one or more compounds of formula I are of formula I-2

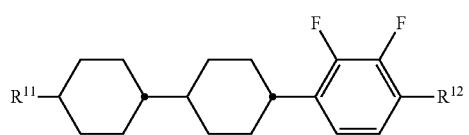

wherein $R^{11}$ and $R^{12}$, independently of one another, denote alkyl having 1 to 7 C atoms,
which compounds of formula I-2 have a concentration of 20-30%, based on the medium.

45. The liquid crystalline medium according to claim 4, wherein one or more compounds of formula I are of formula I-2

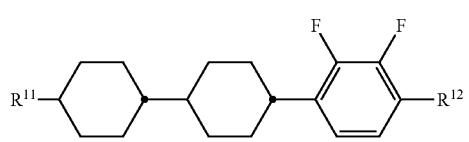

wherein $R^{11}$ and $R^{12}$, independently of one another, denote alkyl having 1 to 7 C atoms,
which compounds of formula I-2 have a concentration of 20-30%, based on the medium.

46. The liquid crystalline medium according to claim 5, wherein one or more compounds of formula I are of formula I-2

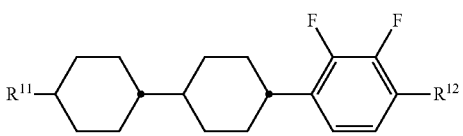

wherein $R^{11}$ and $R^{12}$, independently of one another, denote alkyl having 1 to 7 C atoms,
which compounds of formula I-2 have a concentration of 20-30%, based on the medium.

47. The liquid crystalline medium according to claim 10, wherein one or more compounds of formula I are of formula I-2

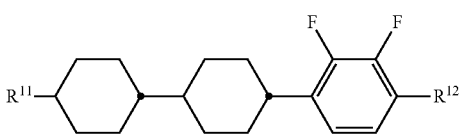

wherein $R^{11}$ and $R^{12}$, independently of one another, denote alkyl having 1 to 7 C atoms,
which compounds of formula I-2 have a concentration of 20-30%, based on the medium.

48. The liquid crystalline medium according to claim 11, wherein one or more compounds of formula I are of formula I-2

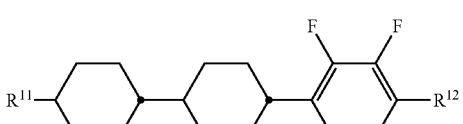

wherein $R^{11}$ and $R^{12}$, independently of one another, denote alkyl having 1 to 7 C atoms,
which compounds of formula I-2 have a concentration of 20-30%, based on the medium.

49. The liquid crystalline medium according to claim 12, wherein one or more compounds of formula I are of formula I-2

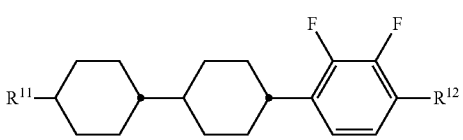

wherein $R^{11}$ and $R^{12}$, independently of one another, denote alkyl having 1 to 7 C atoms, which compounds of formula I-2 have a concentration of 20-30%, based on the medium.

50. The liquid crystalline medium according to claim 13, wherein one or more compounds of formula I are of formula I-2

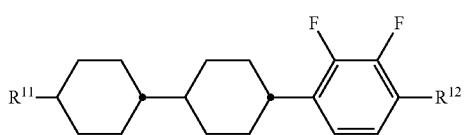

I-2 wherein $R^{11}$ and $R^{12}$, independently of one another, denote alkyl having 1 to 7 C atoms,
which compounds of formula I-2 have a concentration of 20-30%, based on the medium.

51. The liquid crystalline medium according to claim 14, wherein one or more compounds of formula I are of formula I-2

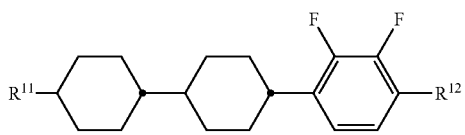

I-2 wherein $R^{11}$ and $R^{12}$, independently of one another, denote alkyl having 1 to 7 C atoms,
which compounds of formula I-2 have a concentration of 20-30%, based on the medium.

52. The liquid crystalline medium according to claim 15, wherein one or more compounds of formula I are of formula I-2

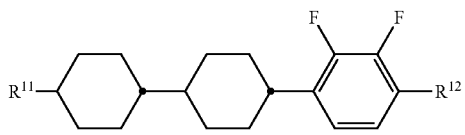

I-2 wherein $R^{11}$ and $R^{12}$, independently of one another, denote alkyl having 1 to 7 C atoms,
which compounds of formula I-2 have a concentration of 20-30%, based on the medium.

53. The liquid crystalline medium according to claim 17, wherein one or more compounds of formula I are of formula I-2

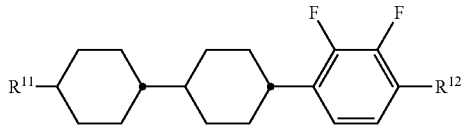

I-2 wherein $R^{11}$ and $R^{12}$, independently of one another, denote alkyl having 1 to 7 C atoms,
which compounds of formula I-2 have a concentration of 20-30%, based on the medium.

54. The liquid crystalline medium according to claim 18, wherein one or more compounds of formula I are of formula I-2

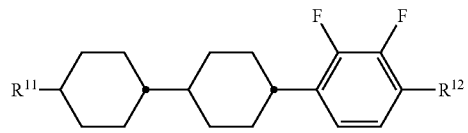

I-2 wherein $R^{11}$ and $R^{12}$, independently of one another, denote alkyl having 1 to 7 C atoms,
which compounds of formula I-2 have a concentration of 20-30%, based on the medium.

55. The liquid crystalline medium according to claim 19, wherein one or more compounds of formula I are of formula I-2

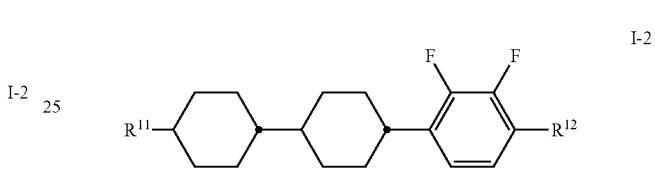

I-2 wherein $R^{11}$ and $R^{12}$, independently of one another, denote alkyl having 1 to 7 C atoms,
which compounds of formula I-2 have a concentration of 20-30%, based on the medium.

56. The liquid crystalline medium according to claim 20, wherein one or more compounds of formula I are of formula I-2

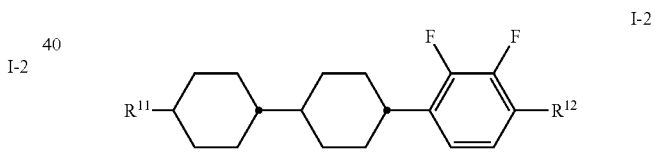

I-2 wherein $R^{11}$ and $R^{12}$, independently of one another, denote alkyl having 1 to 7 C atoms,
which compounds of formula I-2 have a concentration of 20-30%, based on the medium.

57. The liquid crystalline medium according to claim 2, wherein the one or more compounds of Formula II are of one or more of the following formulae

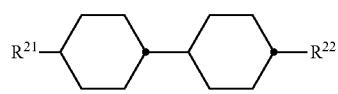

II-1

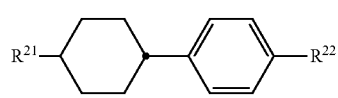

II-2

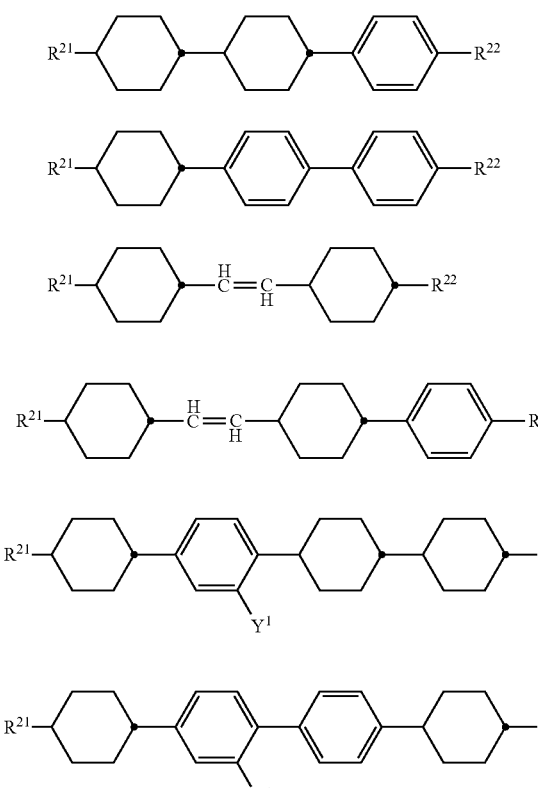

in which $Y^1$ is H or F, and $R^{21}$ and $R^{22}$ are defined as for the compounds of formula II.

58. The liquid crystalline medium according to claim 3, wherein the one or more compounds of Formula II are of one or more of the following formulae

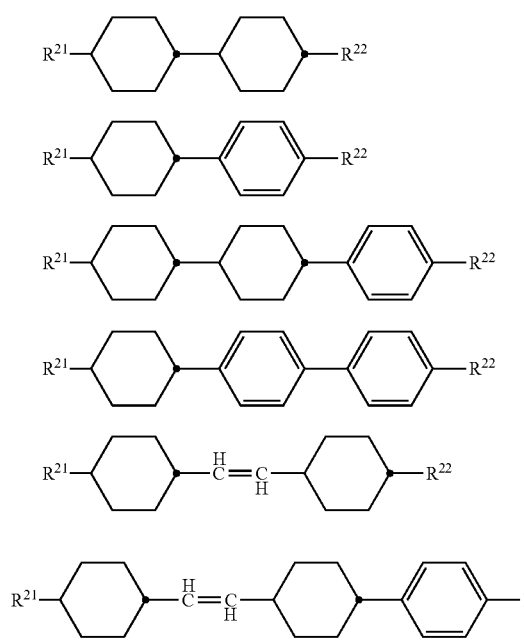

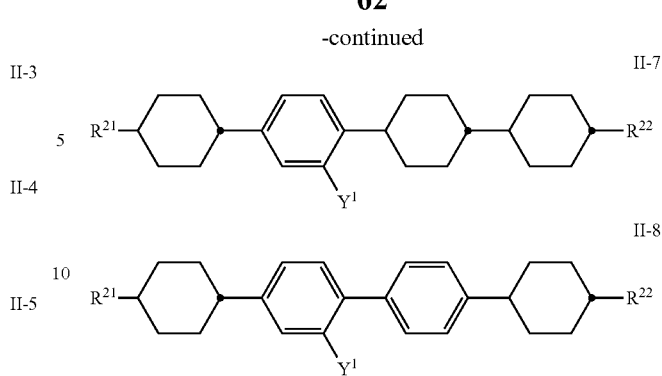

in which $Y^1$ is H or F, and $R^{21}$ and $R^{22}$ are defined as for the compounds of formula II.

59. The liquid crystalline medium according to claim 4, wherein the one or more compounds of Formula II are of one or more of the following formulae

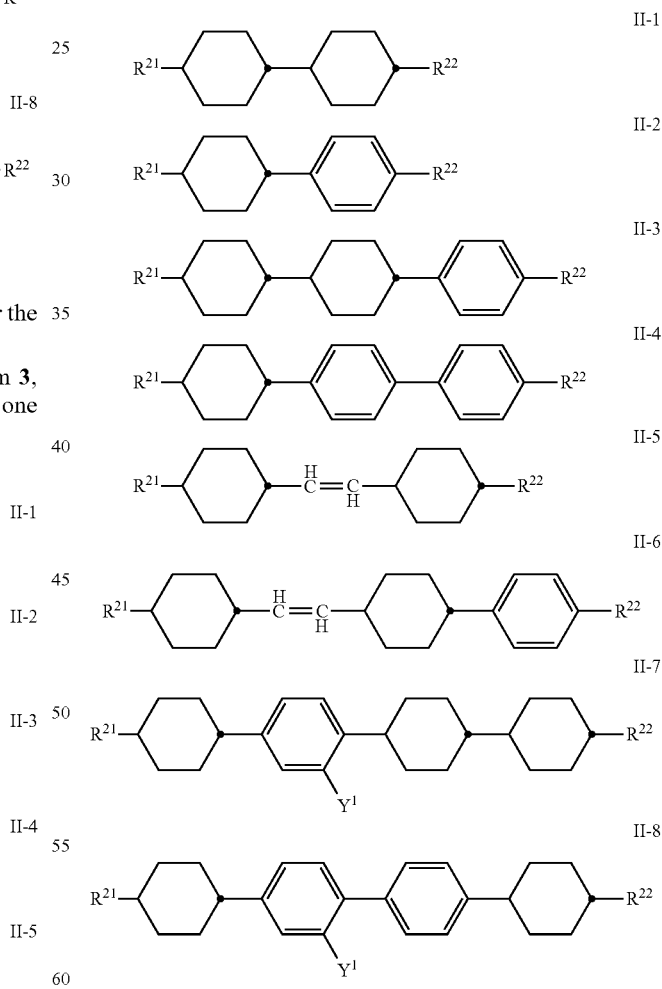

in which $Y^1$ is H or F, and $R^{21}$ and $R^{22}$ are defined as for the compounds of formula II.

60. The liquid crystalline medium according to claim 5, wherein the one or more compounds of Formula II are of one or more of the following formulae

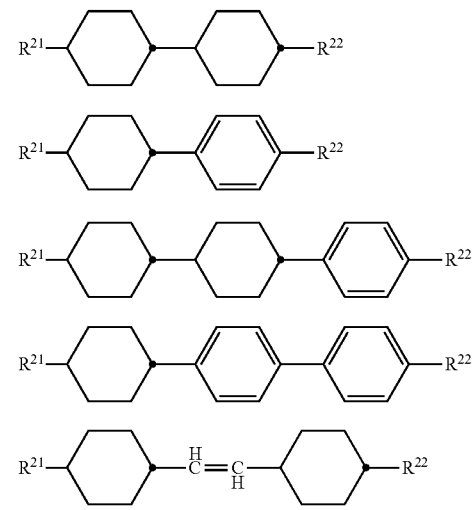

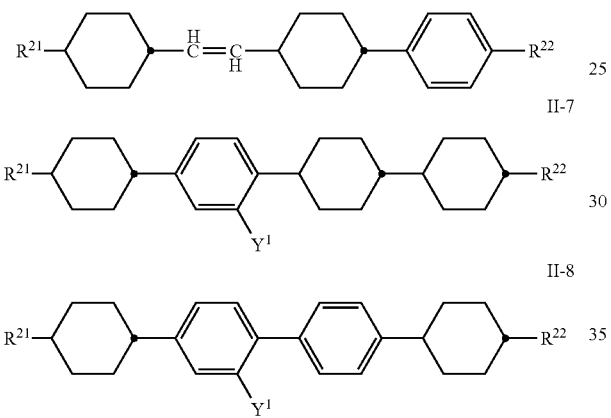

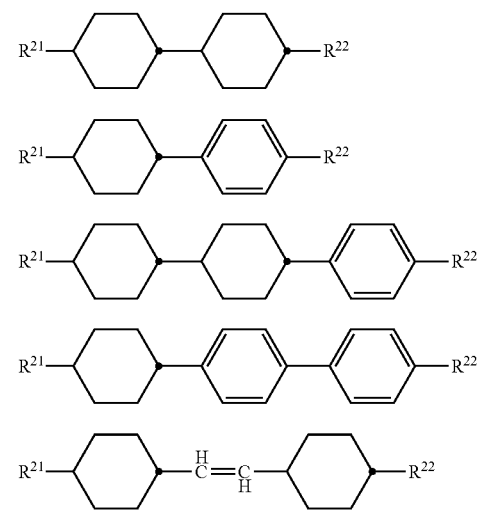

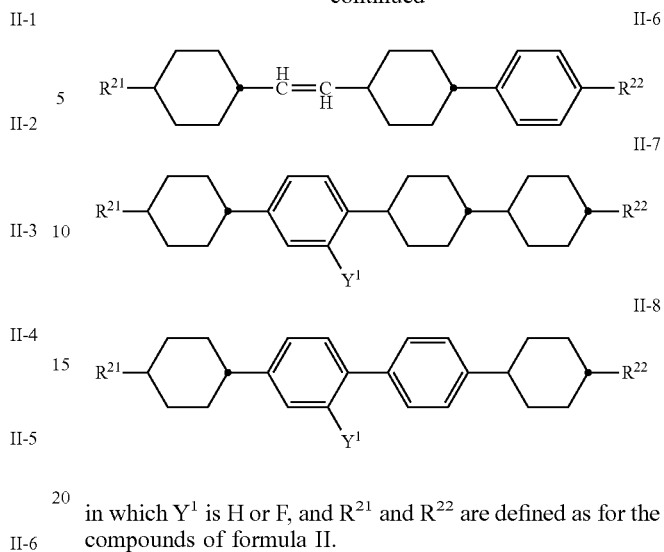

in which $Y^1$ is H or F, and $R^{21}$ and $R^{22}$ are defined as for the compounds of formula II.

62. The liquid crystalline medium according to claim 11, wherein the one or more compounds of Formula II are of one or more of the following formulae

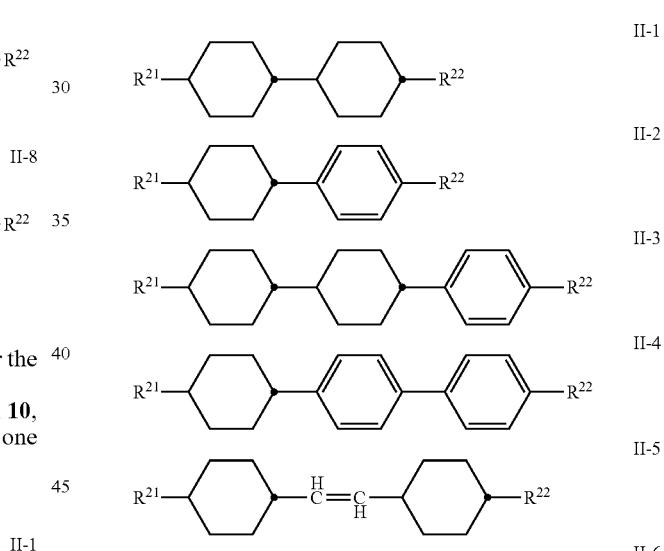

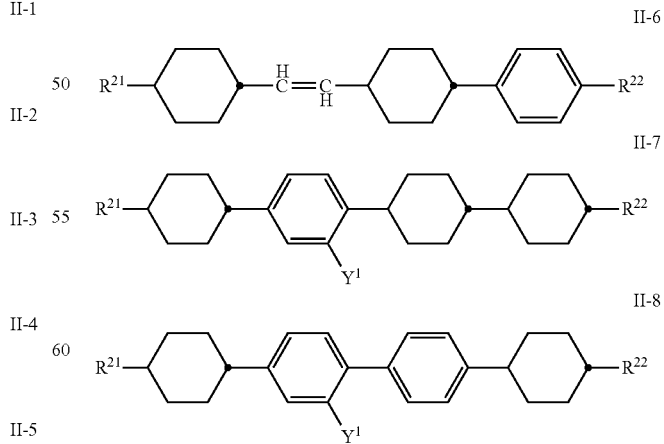

in which $Y^1$ is H or F, and $R^{21}$ and $R^{22}$ are defined as for the compounds of formula II.

61. The liquid crystalline medium according to claim 10, wherein the one or more compounds of Formula II are of one or more of the following formulae

63. The liquid crystalline medium according to claim 12, wherein the one or more compounds of Formula II are of one or more of the following formulae

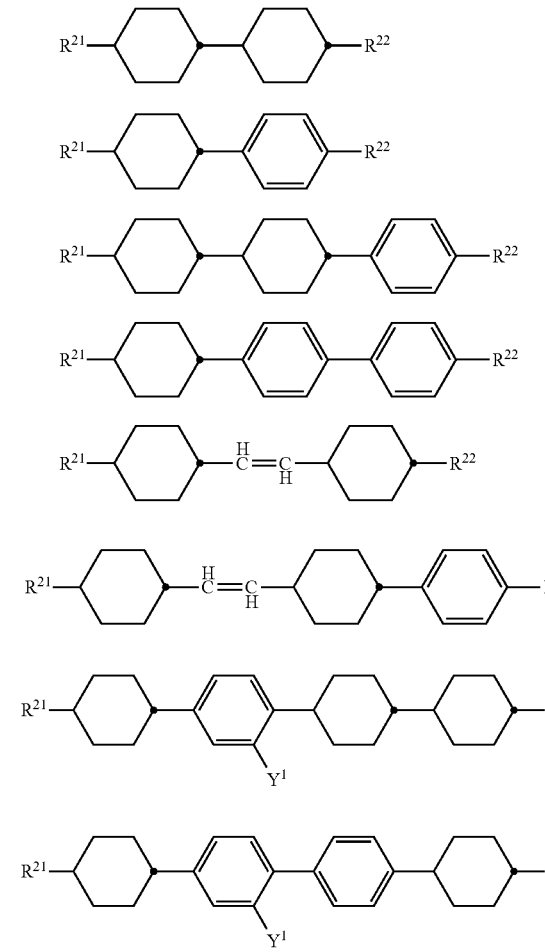

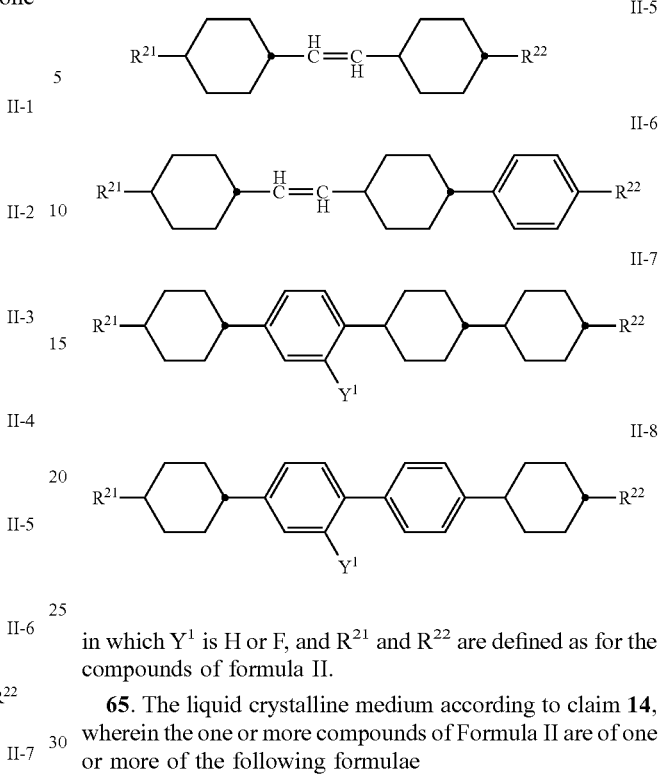

in which $Y^1$ is H or F, and $R^{21}$ and $R^{22}$ are defined as for the compounds of formula II.

64. The liquid crystalline medium according to claim 13, wherein the one or more compounds of Formula II are of one or more of the following formulae

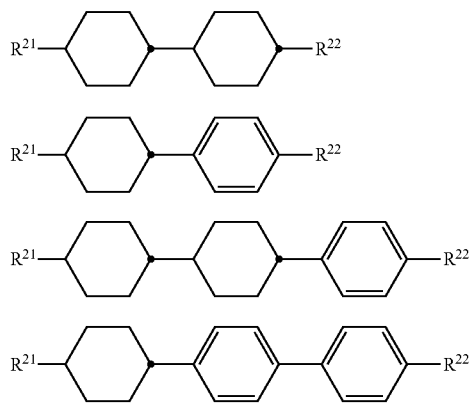

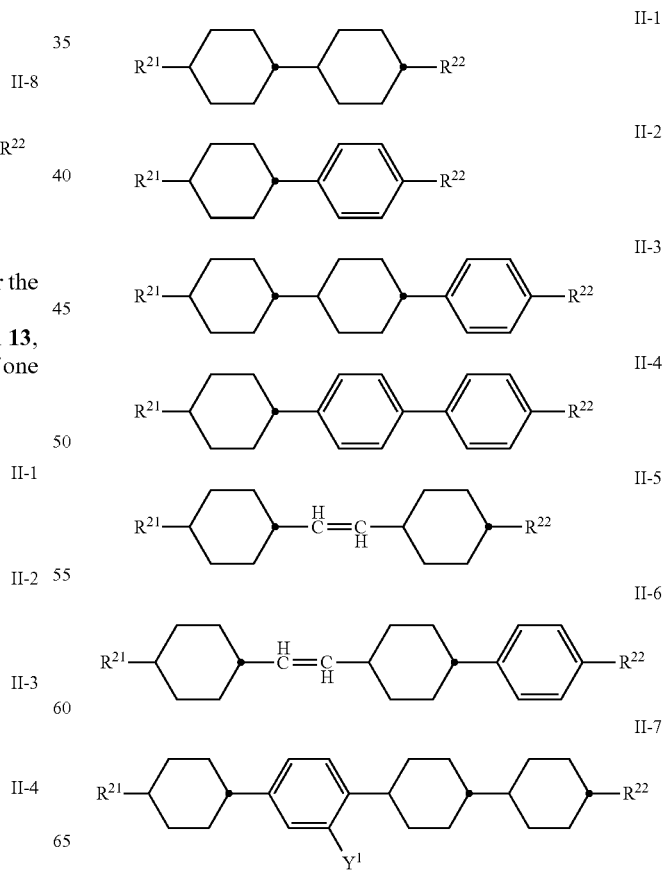

in which $Y^1$ is H or F, and $R^{21}$ and $R^{22}$ are defined as for the compounds of formula II.

65. The liquid crystalline medium according to claim 14, wherein the one or more compounds of Formula II are of one or more of the following formulae -continued

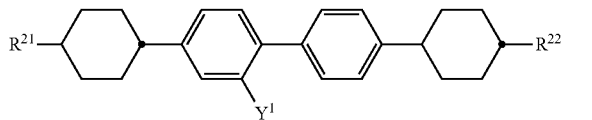
II-8 in which Y¹ is H or F, and R²¹ and R²² are defined as for the compounds of formula II.

66. The liquid crystalline medium according to claim 15, wherein the one or more compounds of Formula II are of one or more of the following formulae

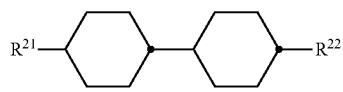
II-1

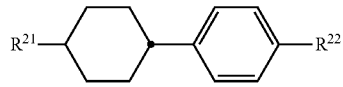
II-2

II-3

II-4

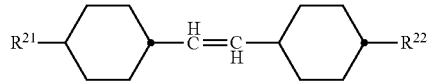
II-5

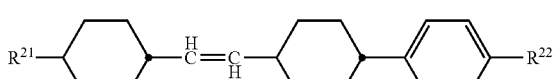
II-6

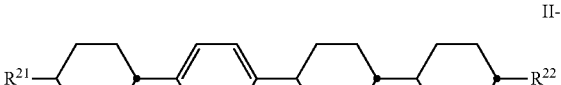
II-7

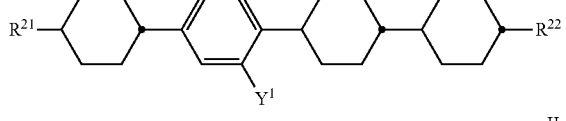
II-8 in which Y¹ is H or F, and R²¹ and R²² are defined as for the compounds of formula II.

67. The liquid crystalline medium according to claim 16, wherein the one or more compounds of Formula II are of one or more of the following formulae

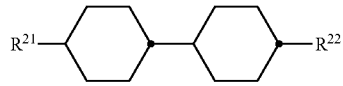
II-1

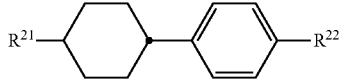
II-2

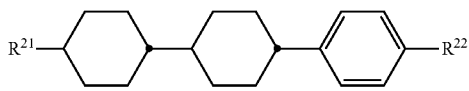
II-3

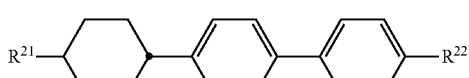
II-4

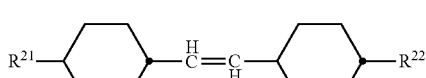
II-5

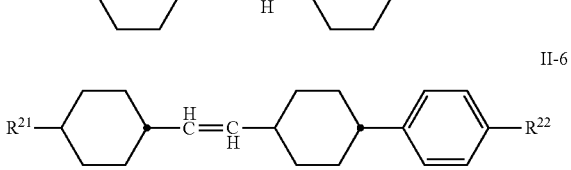
II-6

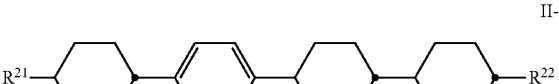
II-7

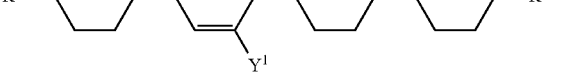
II-8 in which Y¹ is H or F, and R²¹ and R²² are defined as for the compounds of formula II.

68. The liquid crystalline medium according to claim 17, wherein the one or more compounds of Formula II are of one or more of the following formulae

II-1

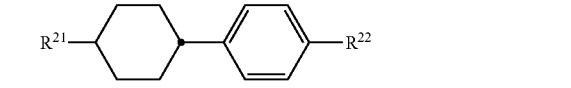
II-2

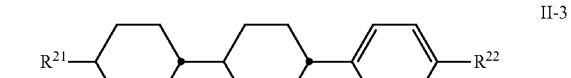
II-3

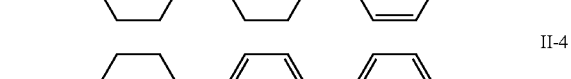
II-4

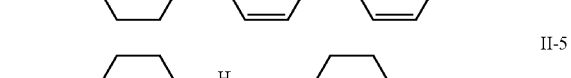
II-5

-continued

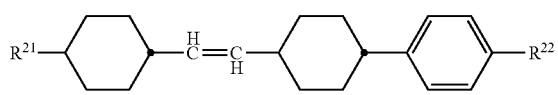
II-6

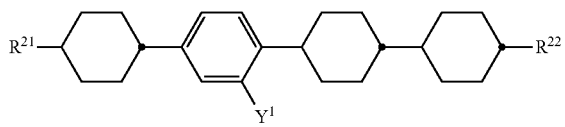
II-7

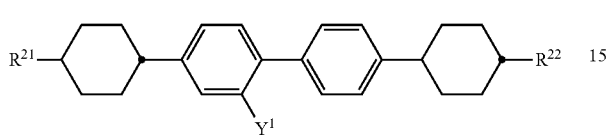
II-8 in which Y¹ is H or F, and R²¹ and R²² are defined as for the compounds of formula II.

69. The liquid crystalline medium according to claim 18, wherein the one or more compounds of Formula II are of one or more of the following formulae

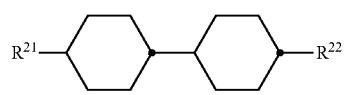
II-1

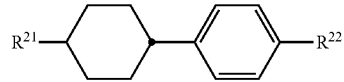
II-2

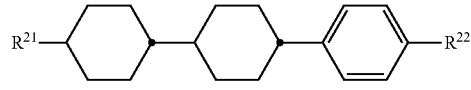
II-3

II-4

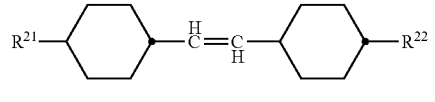
II-5

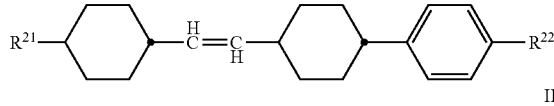
II-6

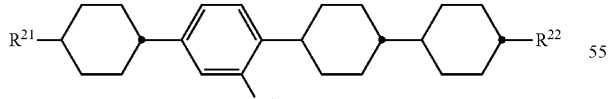
II-7

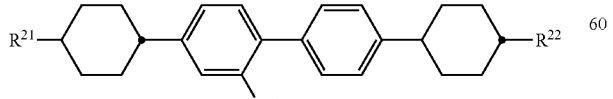
II-8 in which Y¹ is H or F, and R²¹ and R²² are defined as for the compounds of formula II.

70. The liquid crystalline medium according to claim 19, wherein the one or more compounds of Formula II are of one or more of the following formulae

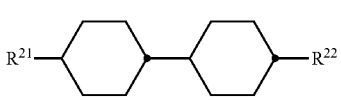
II-1

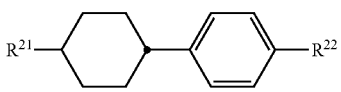
II-2

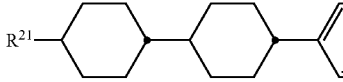
II-3

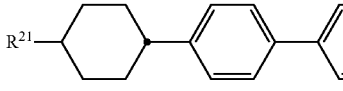
II-4

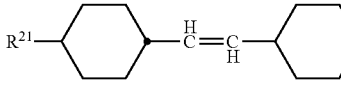
II-5

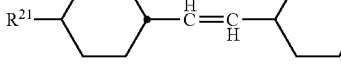
II-6

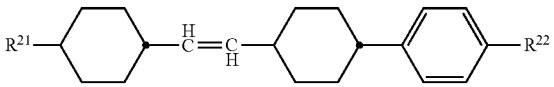
II-6

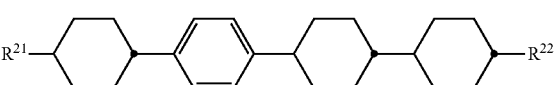
II-7

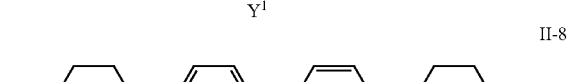
II-8

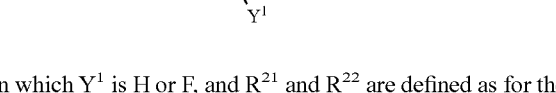

in which Y¹ is H or F, and R²¹ and R²² are defined as for the compounds of formula II.

71. The liquid crystalline medium according to claim 20, wherein the one or more compounds of Formula II are of one or more of the following formulae

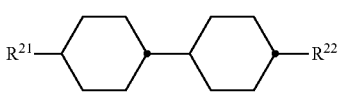
II-1

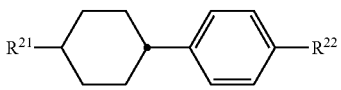
II-2

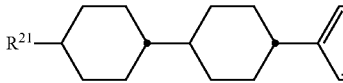
II-3

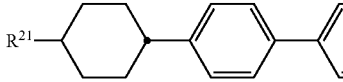
II-4

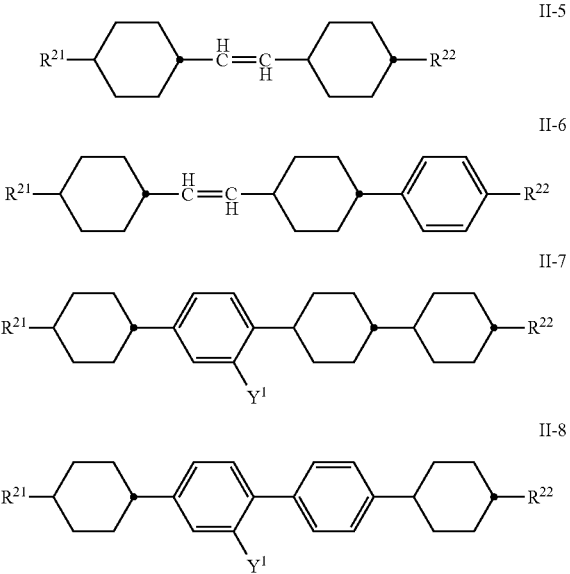

in which Y¹ is H or F, and $R^{21}$ and $R^{22}$ are defined as for the compounds of formula II.

72. The liquid crystalline medium according to claim 21, wherein the one or more compounds of Formula II are of one or more of the following formulae

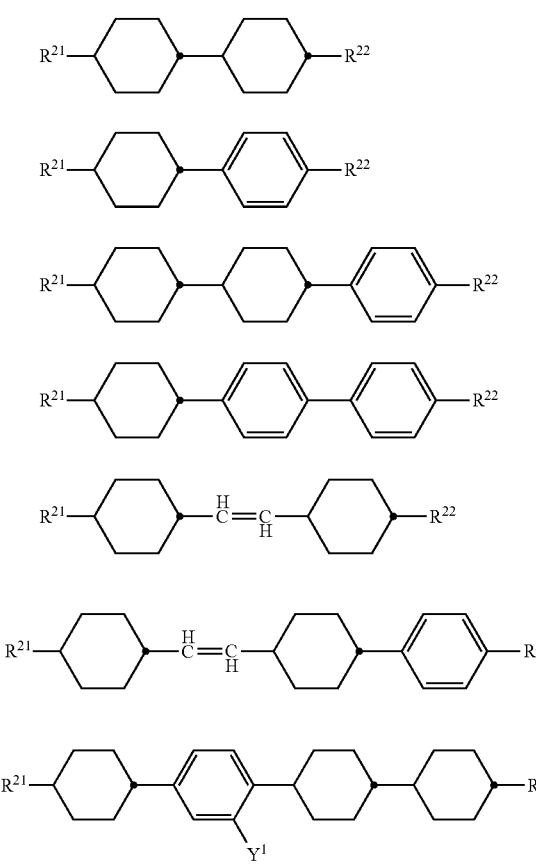

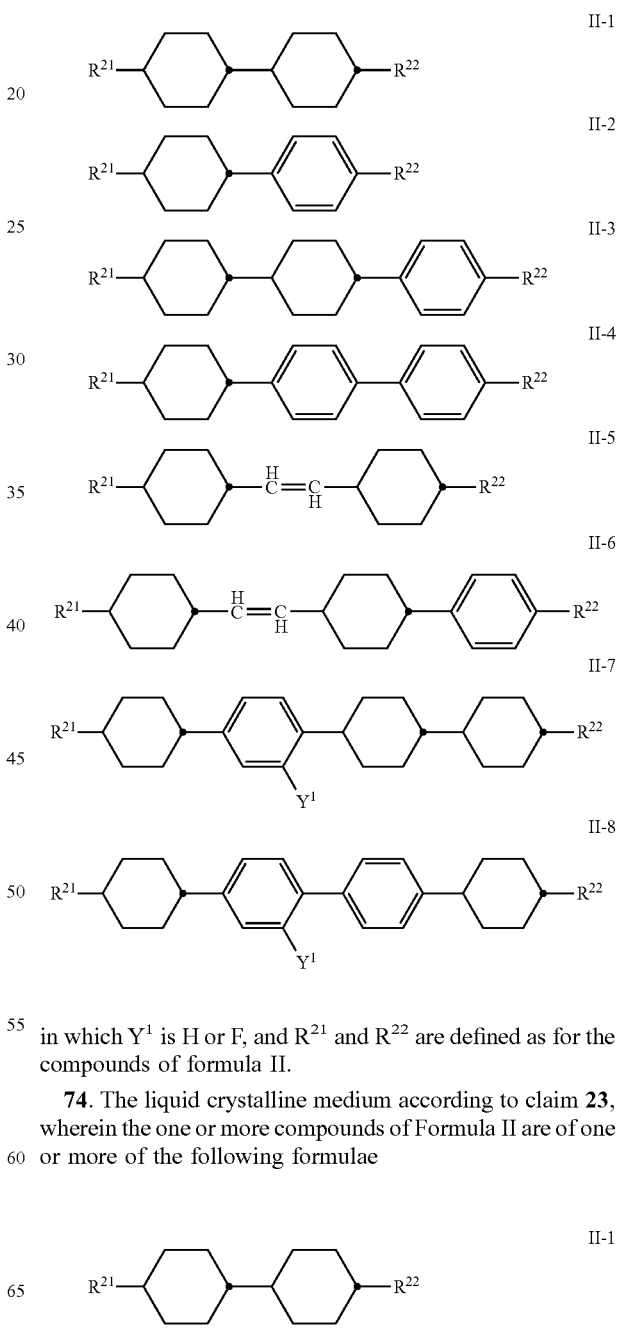

in which Y¹ is H or F, and $R^{21}$ and $R^{22}$ are defined as for the compounds of formula II.

73. The liquid crystalline medium according to claim 22, wherein the one or more compounds of Formula II are of one or more of the following formulae in which Y¹ is H or F, and $R^{21}$ and $R^{22}$ are defined as for the compounds of formula II.

74. The liquid crystalline medium according to claim 23, wherein the one or more compounds of Formula II are of one or more of the following formulae -continued

II-2

R²¹―⟨cyclohexyl⟩―⟨phenyl⟩―R²²

II-3

R²¹―⟨cyclohexyl⟩―⟨cyclohexyl⟩―⟨phenyl⟩―R²²

II-4

R²¹―⟨cyclohexyl⟩―⟨phenyl⟩―⟨phenyl⟩―R²²

II-5

R²¹―⟨cyclohexyl⟩―CH=CH―⟨cyclohexyl⟩―R²²

II-6

R²¹―⟨cyclohexyl⟩―CH=CH―⟨cyclohexyl⟩―⟨phenyl⟩―R²²

II-7

R²¹―⟨cyclohexyl⟩―⟨phenyl(Y¹)⟩―⟨cyclohexyl⟩―⟨cyclohexyl⟩―R²²

II-8

R²¹―⟨cyclohexyl⟩―⟨phenyl(Y¹)⟩―⟨phenyl⟩―⟨cyclohexyl⟩―R²² in which $Y^1$ is H or F, and $R^{21}$ and $R^{22}$ are defined as for the compounds of formula II.

75. The liquid-crystalline medium according to claim 2, wherein the one or more compounds of Formula II contain or are a compound of the formula CC-3-V:

$H_7C_3$―⟨H⟩―⟨H⟩―CH=CH₂ .

76. The liquid-crystalline medium according to claim 3, wherein the one or more compounds of Formula II contain or are a compound of the formula CC-3-V:

$H_7C_3$―⟨H⟩―⟨H⟩―CH=CH₂ .

77. The liquid-crystalline medium according to claim 4, wherein the one or more compounds of Formula II contain or are a compound of the formula CC-3-V:

$H_7C_3$―⟨H⟩―⟨H⟩―CH=CH₂ .

78. The liquid-crystalline medium according to claim 5, wherein the one or more compounds of Formula II contain or are a compound of the formula CC-3-V:

$H_7C_3$―⟨H⟩―⟨H⟩―CH=CH₂ .

79. The liquid-crystalline medium according to claim 10, wherein the one or more compounds of Formula II contain or are a compound of the formula CC-3-V:

$H_7C_3$―⟨H⟩―⟨H⟩―CH=CH₂ .

80. The liquid-crystalline medium according to claim 11, wherein the one or more compounds of Formula II contain or are a compound of the formula CC-3-V:

$H_7C_3$―⟨H⟩―⟨H⟩―CH=CH₂ .

81. The liquid-crystalline medium according to claim 12, wherein the one or more compounds of Formula II contain or are a compound of the formula CC-3-V:

$H_7C_3$―⟨H⟩―⟨H⟩―CH=CH₂ .

82. The liquid-crystalline medium according to claim 13, wherein the one or more compounds of Formula II contain or are a compound of the formula CC-3-V:

$H_7C_3$―⟨H⟩―⟨H⟩―CH=CH₂ .

83. The liquid-crystalline medium according to claim 14, wherein the one or more compounds of Formula II contain or are a compound of the formula CC-3-V:

$H_7C_3$―⟨H⟩―⟨H⟩―CH=CH₂ .

84. The liquid-crystalline medium according to claim 15, wherein the one or more compounds of Formula II contain or are a compound of the formula CC-3-V:

$H_7C_3$―⟨H⟩―⟨H⟩―CH=CH₂ .

85. The liquid-crystalline medium according to claim 16, wherein the one or more compounds of Formula II contain or are a compound of the formula CC-3-V:

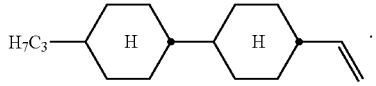

86. The liquid-crystalline medium according to claim 17, wherein the one or more compounds of Formula II contain or are a compound of the formula CC-3-V:

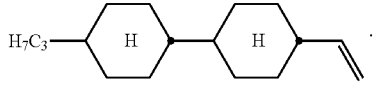

87. The liquid-crystalline medium according to claim 18, wherein the one or more compounds of Formula II contain or are a compound of the formula CC-3-V:

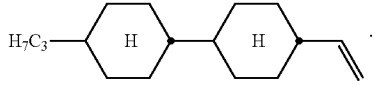

88. The liquid-crystalline medium according to claim 19, wherein the one or more compounds of Formula II contain or are a compound of the formula CC-3-V:

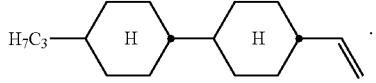

89. The liquid-crystalline medium according to claim 20, wherein the one or more compounds of Formula II contain or are a compound of the formula CC-3-V:

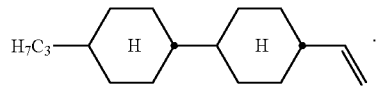

90. The liquid-crystalline medium according to claim 21, wherein the one or more compounds of Formula II contain or are a compound of the formula CC-3-V:

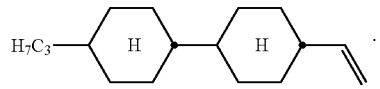

91. The liquid-crystalline medium according to claim 22, wherein the one or more compounds of Formula II contain or are a compound of the formula CC-3-V:

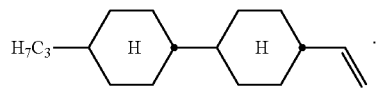

92. The liquid-crystalline medium according to claim 23, wherein the one or more compounds of Formula II contain or are a compound of the formula CC-3-V:

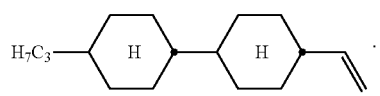

93. The liquid-crystalline medium according to claim 25, wherein the one or more compounds of Formula II contain or are a compound of the formula CC-3-V:

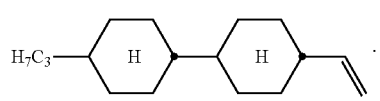

* * * * *